United States Patent
Wang et al.

(10) Patent No.: US 12,323,826 B2
(45) Date of Patent: *Jun. 3, 2025

(54) DETECTION OF INSUFFICIENT RF COVERAGE AREAS IN A WIRELESS NETWORK

(71) Applicant: Juniper Networks, Inc., Sunnyvale, CA (US)

(72) Inventors: Wenfeng Wang, Cupertino, CA (US); Jacob Thomas, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,863

(22) Filed: Nov. 20, 2023

(65) Prior Publication Data

US 2024/0089753 A1 Mar. 14, 2024

Related U.S. Application Data

(63) Continuation of application No. 17/643,390, filed on Dec. 8, 2021, now Pat. No. 11,843,957.

(Continued)

(51) Int. Cl.
*H04W 24/02* (2009.01)
*H04W 28/02* (2009.01)

(52) U.S. Cl.
CPC ....... *H04W 24/02* (2013.01); *H04W 28/0268* (2013.01)

(58) Field of Classification Search
None
See application file for complete search history.

(56) References Cited

U.S. PATENT DOCUMENTS

| 9,729,439 B2 | 8/2017 | MeLampy et al. |
| 9,729,682 B2 | 8/2017 | Kumar et al. |

(Continued)

FOREIGN PATENT DOCUMENTS

| EP | 3700133 A1 | 8/2020 |
| WO | 2010051838 A1 | 5/2010 |

(Continued)

OTHER PUBLICATIONS

Agyekum, "Improved Text of New Recommendation, E.QoSMgtMod (for Consent)", National Communications Authority (Ghana), Telecommunication Standardization Sector, Nov. 2019, 34 pp.

(Continued)

*Primary Examiner* — Andre Tacdiran
(74) *Attorney, Agent, or Firm* — Shumaker & Sieffert, P.A.

(57) ABSTRACT

Techniques are described that detect areas with insufficient radio frequency (RF) coverage in a wireless network. A network management system (NMS) determines one or more service level expectation (SLE) metrics for each client device in a wireless network. The SLE metrics are aggregated to each access point (AP) in the wireless network, and each AP is assigned an AP score based on the aggregated SLE metrics. To identify potential coverage holes, the NMS groups APs having poor AP scores. If a root cause of the poor AP scores cannot be automatically resolved and if the poor AP scores persist for a predetermined period of time, the group of APs is determined to represent a true coverage hole. The NMS may generate a notification regarding recommended corrective actions to the customer and/or IT personnel.

19 Claims, 11 Drawing Sheets

Related U.S. Application Data

(60) Provisional application No. 63/171,374, filed on Apr. 6, 2021.

(56) References Cited

U.S. PATENT DOCUMENTS

| | | |
|---|---|---|
| 9,762,485 B2 | 9/2017 | Kaplan et al. |
| 9,832,082 B2 | 11/2017 | Dade et al. |
| 9,871,748 B2 | 1/2018 | Gosselin et al. |
| 9,985,883 B2 | 5/2018 | MeLampy et al. |
| 10,200,264 B2 | 2/2019 | Menon et al. |
| 10,277,506 B2 | 4/2019 | Timmons et al. |
| 10,432,522 B2 | 10/2019 | Kaplan et al. |
| 10,756,983 B2 | 8/2020 | Ratkovic et al. |
| 10,862,742 B2 | 12/2020 | Singh |
| 10,958,537 B2 | 3/2021 | Safavi |
| 10,958,585 B2 | 3/2021 | Safavi |
| 10,985,969 B2 | 4/2021 | Safavi |
| 10,986,607 B2 | 4/2021 | Ta et al. |
| 10,992,543 B1 | 4/2021 | Rachamadugu et al. |
| 2002/0073355 A1 | 6/2002 | Cerami |
| 2008/0032727 A1* | 2/2008 | Stephenson ............ H04W 24/00 455/513 |
| 2013/0188608 A1 | 7/2013 | Balachandran et al. |
| 2014/0036656 A1* | 2/2014 | Chou ..................... H04W 76/16 370/216 |
| 2014/0269269 A1 | 9/2014 | Kovvali et al. |
| 2014/0315538 A1 | 10/2014 | Hamalainen et al. |
| 2015/0280969 A1* | 10/2015 | Gates ................. H04L 41/0631 714/37 |
| 2015/0373574 A1 | 12/2015 | Gordon |
| 2016/0065419 A1 | 3/2016 | Szilagyi et al. |
| 2016/0380892 A1 | 12/2016 | Mahadevan et al. |
| 2017/0324439 A1* | 11/2017 | Desai ....................... H04B 1/48 |
| 2019/0319868 A1 | 10/2019 | Svennebring et al. |
| 2019/0379700 A1 | 12/2019 | Canzanese, Jr. et al. |
| 2020/0028746 A1 | 1/2020 | Zawadzki et al. |
| 2020/0213236 A1 | 7/2020 | Safavi |
| 2020/0235986 A1* | 7/2020 | Embarmannar Vijayan ................ G06F 9/45541 |
| 2020/0403890 A1 | 12/2020 | McCulley et al. |
| 2021/0239850 A1 | 8/2021 | Castagnoli et al. |
| 2021/0243558 A1 | 8/2021 | Castagnoli et al. |
| 2021/0243559 A1 | 8/2021 | Castagnoli et al. |
| 2021/0306201 A1 | 9/2021 | Wang et al. |
| 2021/0307084 A1 | 9/2021 | Wang et al. |
| 2022/0330047 A1 | 10/2022 | Wang et al. |

FOREIGN PATENT DOCUMENTS

| | | | |
|---|---|---|---|
| WO | WO2012043796 | * | 5/2012 |
| WO | WO2013084704 | * | 6/2013 |
| WO | 2016060805 A1 | | 4/2016 |

OTHER PUBLICATIONS

Extended Search Report from counterpart European Application No. 22159688.5 dated Jul. 29, 2022, 13 pp.

Prosecution History from U.S. Appl. No. 17/643,390, dated Mar. 14, 2023 through Aug. 1, 2023, 54 pp.

Response to Extended Search Report dated Jul. 29, 2022, from counterpart European Application No. 22159688.5 filed Apr. 12, 2023, 18 pp.

Communciation pursuant to Article 94(3) EPC from counterpart European Application No. 22159688.5 dated Apr. 9, 2025, 15 pp.

* cited by examiner

DETECTION OF INSUFFICIENT RF COVERAGE AREAS IN A WIRELESS NETWORK

This application is a continuation of U.S. patent application Ser. No. 17/643,390, filed 8 Dec. 2021, which claims the benefit of U.S. Provisional Patent Application No. 63/171,374, filed 6 Apr. 2021, the entire content of each application is incorporated herein by reference.

FIELD

The disclosure relates generally to computer networks and, more specifically, wireless access networks.

BACKGROUND

A wireless access point (AP) is a device that allows other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

In many cases, a wireless access point may have a relatively short range, such as about 20 meters or less. As such, multiple overlapping wireless access points are often used to cover relatively large areas. For example, administrators associated with commercial premises, such as an office, hospital, airport, stadium, or retail outlet, may install a network of wireless access points throughout the premises. As a mobile device is moved throughout the premises, the devices may automatically switch to an in-range wireless access point to provide the users with seamless network connectivity throughout the premises.

SUMMARY

In general, this disclosure describes techniques for detection of areas with insufficient radio frequency (RF) coverage within a wireless network. A "coverage hole" or area with insufficient RF coverage, as referred to herein, is an area or location at premises where mobile wireless devices receive weak or little RF signal strength, leading to a poor user experience and, in some cases, lack of connectivity.

As described herein, a device, such as a network management system (NMS), automatically detects one or more "true" coverage holes in a wireless network. A "true" coverage hole, as referred to herein, is an area with insufficient RF coverage that cannot be automatically resolved and that persists for at least a predetermined period of time. The NMS detects coverage holes within a wireless network based on one or more Service Level Expectation (SLE) metrics for client devices in the wireless network. In some examples, the SLE metrics may include, but are not limited to, a received signal strength indication (RSSI), a corresponding coverage metric, an insufficient capacity metric and/or a roaming metric for each client device. However, any SLE metric or other metric that measures one or more aspects of wireless network performance may be used, and the disclosure is not limited in this respect.

In some examples, the NMS classifies each SLE metric as "good," "fair," or "poor." In other examples, the NMS classifies each SLE metric as "good" or "poor." The classified SLE metrics are periodically aggregated to an associated one of the plurality of access point (AP) devices on a per-AP basis. Each AP is assigned an AP score based on the aggregated SLE metrics associated with that AP. The NMS builds a data structure, such as a network connectivity graph, including data that represents network connectivity of the APs at the site. The network connectivity graph may include data indicative of neighbor relationships between APs at the site. To identify potential coverage holes, the NMS groups APs by identifying a first AP assigned a poor AP score and having at least a predetermined number of neighboring APs that were also assigned a poor AP score. For each AP in a group, the NMS may also determine whether a root cause of the poor AP score for that AP can be automatically identified and/or addressed. If so, the NMS determines that the group of APs does not represent a true coverage hole. If the root cause of the poor coverage for at least one of the APs in a group cannot be addressed automatically, the NMS monitors the potential coverage hole to determine whether it persists for at least a predetermined period of time. If the potential coverage hole is not persistent, the NMS determines that the group of APs does not represent a true coverage hole. If the potential coverage hole is persistent, the NMS determines that the group of APs represents a true coverage hole and generates a notification regarding the true coverage hole to the customer and/or an IT service provider.

The techniques of this disclosure provide one or more technical advantages. For example, the techniques provide for automatic identification of APs forming a so-called "true" coverage hole in a wireless network. A "true" coverage hole is an area with insufficient RF coverage that cannot be automatically resolved and that persists for at least a predetermined period of time. Rather than manual testing of each AP and monitoring of wireless signal strength to identify potential coverage holes, the techniques of the disclosure replace manual troubleshooting tasks with automated wireless operations. This may help to minimize costs while maximizing Wi-Fi performance and reliability. As another advantage, the techniques of the disclosure, in some examples, automatically determine whether the root cause of a potential coverage hole may be automatically resolved, and automatically invokes one or more corrective actions aimed at addressing the potential coverage hole, thus eliminating the need for manual intervention and proactively optimizing wireless network performance. The techniques of the disclosure identify a group of specific APs having positions that introduce one or more true coverage holes and automatically generate recommended corrective actions that may be taken by IT personnel to resolve the root cause. As such, the techniques save time and effort by IT personnel by applying technical solutions that pinpoint which APs need to be addressed and the specific remedial action(s) to be taken. In addition, by automatically addressing potential coverage holes and identifying true coverage holes, the techniques of the present disclosure may result in a higher quality user experience as measured by one or more SLE metrics.

In one example, the disclosure is directed to a method comprising aggregating, by a network management system (NMS) that manages a plurality of access point (AP) devices in a wireless network, each of a plurality of service level expectation (SLE) metrics associated with the wireless network to an associated one of the plurality of AP devices in the wireless network; assigning, by the NMS, an AP score to each one of the plurality of AP devices based on the associated aggregated SLE metrics; grouping, by the NMS, at least two of the plurality of AP devices assigned a poor AP score; and identifying, by the NMS, a potential area in the wireless network having insufficient radio frequency (RF) coverage based on the grouping.

In another example, the disclosure is directed to a network management device that manages one or more access point (AP) devices in a wireless network, comprising a memory; and one or more processors operably coupled to the memory, wherein the one or more processors are configured to: aggregate each of a plurality of service level expectation (SLE) metrics associated with the wireless network to one of the plurality of AP devices in the wireless network; assign an AP score to each one of the plurality of AP devices based on the aggregated SLE metrics; group at least two of the plurality of AP devices assigned a poor AP score; and identify a potential area in the wireless network having insufficient radio frequency (RF) coverage based on the grouping.

In another example, the disclosure is directed to a computer-readable storage medium comprising instructions that, when executed, configure processing circuitry to: aggregate each of a plurality of service level expectation (SLE) metrics associated with a wireless network to one of a plurality of AP devices in the wireless network; assign an AP score to each one of the plurality of AP devices based on the aggregated SLE metrics; group at least two of the plurality of AP devices assigned a poor AP score; and identify a potential area in the wireless network having insufficient radio frequency (RF) coverage based on the grouping.

DETAILED DESCRIPTION

Figure 1A:
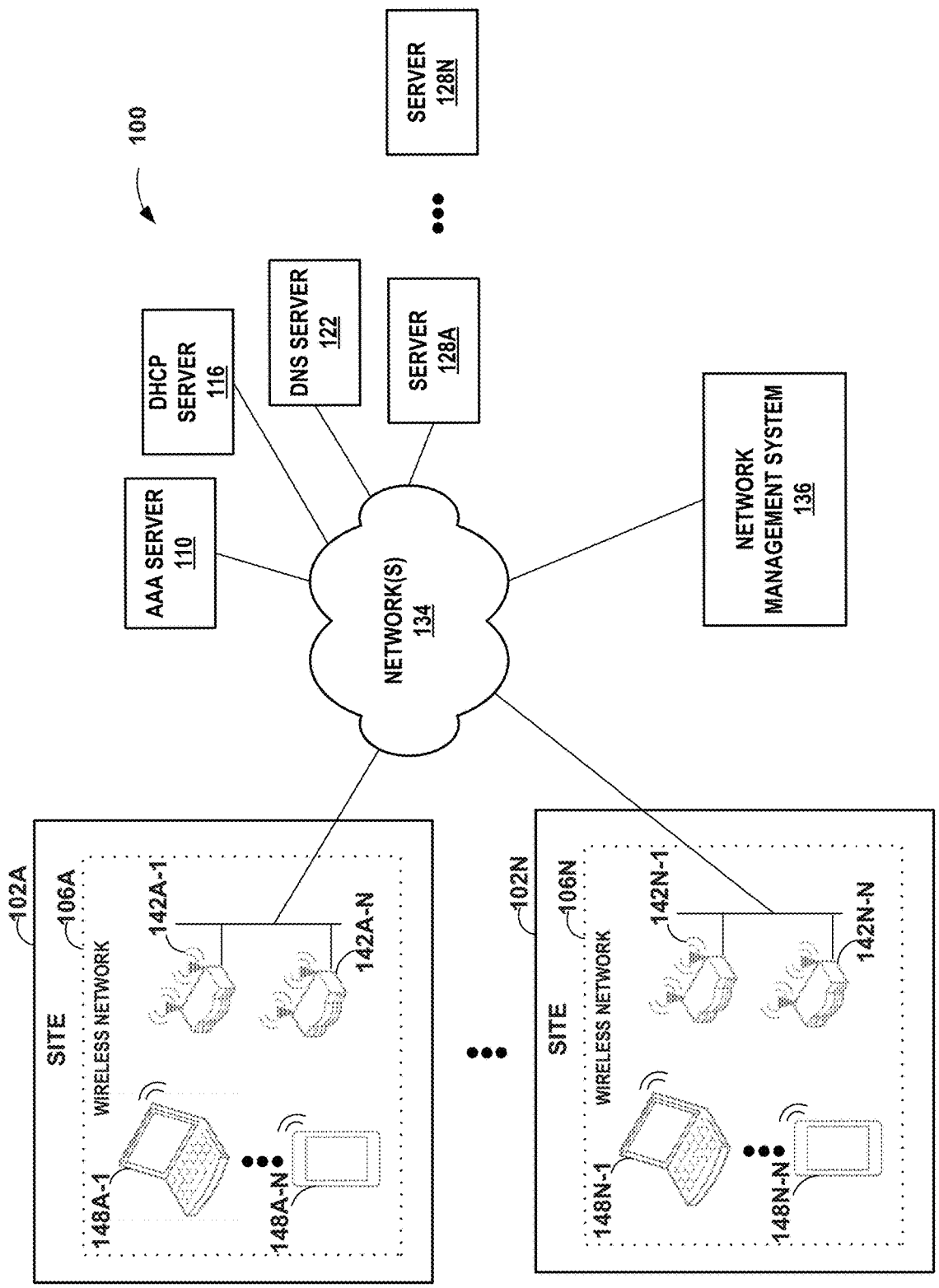
FIG. 1A is a block diagram of an example network system configured to detect areas of insufficient RF coverage in wireless networks at one or more sites in the network system, in accordance with one or more techniques of this disclosure.

Commercial premises, such as offices, hospitals, airports, stadiums, or retail outlets, often install a network of wireless access points (APs) throughout the premises to provide wireless network services to one or more client devices (or simply, "clients") at the site. The clients may include, for example, smart phones or other mobile devices, Internet of Things (IoT) devices, etc. As the mobile clients move throughout the premises, they may automatically switch from one wireless access point to another, in-range wireless access point, so as to provide the users with seamless network connectivity throughout the premises. In addition, if a particular wireless access point provides poor coverage, clients may attempt to connect to a different wireless access point having better coverage.

Wireless network service providers may monitor one or more network performance metrics to measure the performance of a wireless network at a site. For example, service level expectation (SLE) metrics may be used to measure various aspects of wireless network performance. SLE metrics seek to measure and understand network performance from the viewpoint of the end user experience on the network. One example SLE metric is a coverage metric, which tracks the number of user minutes that a client's received signal strength indicator (RSSI) as measured by an access point to which the client is connected is below a configurable threshold. Another example SLE metric is a roaming metric, which tracks a client's percentage of successful roams between two access points that are within prescribed thresholds. Other example SLE metrics may include time to connect, throughput, successful connects, capacity (e.g., insufficient capacity), AP uptime, and/or any other metric that may be indicative of one or more aspects of wireless network performance. The thresholds may be customized and configured by the wireless service provider to define service level expectations at the site.

A "coverage hole" or area with insufficient radio frequency (RF) coverage is the radio area at a site where wireless clients fail to receive good signal strength, leading to a poor user experience. This could be caused by several factors including an insufficient number of access points to adequately cover the site, access point(s) that are not positioned to support maximum wireless performance, interference with the radio frequency environment by walls, fixtures, or other objects at the site, etc. It can be very challenging and time-consuming for customers to identify insufficient RF coverage areas in wireless networks installed at a site.

In accordance with one or more techniques describe herein, the disclosure describes techniques for detection of insufficient RF coverage areas in a wireless network. In some examples, a network management system (NMS) determines one or more SLE metrics for each client device at a site. In some examples, the SLE metrics may include a coverage metric, an insufficient capacity metric, and/or a roaming metric. However, any SLE metric or other metric that measures one or more aspects of wireless network performance may be used, and the disclosure is not limited in this respect. In some examples, the NMS classifies each SLE metric as "good," "fair," or "poor." In other examples, the NMS classifies each SLE metric as "good" or "poor." The classified SLE metrics are periodically aggregated to an associated one of the plurality of AP devices on a per-AP basis. Each AP is assigned an AP score of based on the aggregated SLE metrics associated with that AP.

The NMS builds a data structure, such as a network connectivity graph, indicative of network connectivity of the APs at the site. The network connectivity graph may include data indicative of neighbor relationships between APs at the site. The network connectivity graph includes neighbor information for each AP at the site. In some examples, to identify potential coverage holes, the NMS groups APs by identifying a first AP assigned a poor AP score and having at least a threshold number (e.g., one, two, or more) neighboring APs that were also assigned a poor AP score, thereby defining a group of neighboring APs having poor AP scores. In some examples, the NMS corrects (or attempts to correct) one or more of the poor AP score(s) by automatically adjusting the transmit power of one or more APs in the group. In another example, for each AP in a group, the NMS determines whether the root cause of the poor AP score for that AP may be automatically resolved. If so, the NMS determines that the group of APs does not represent a true coverage hole requiring manual intervention, such as repositioning of the APs, introduction of an additional AP, or inspection of the site to identify possible sources of interference with the wireless signals. If the root cause of the poor AP score for all of the APs in a group cannot be addressed automatically, the NMS monitors the potential coverage hole to determine whether it persists for a prescribed threshold period of time. If the potential coverage hole is not persistent, the group of APs does not represent a true coverage hole. If the potential coverage hole is persistent, the NMS determines that the group of APs represents a true coverage hole and generates a notification regarding the true coverage hole to the customer and/or an IT service provider.

FIG. 1A is a diagram of an example network system 100 configured to detect insufficient RF coverage areas in wireless networks at one or more sites, in accordance with one or more techniques of this disclosure.

Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of access points (APs), referred to generally as APs 142. For example, site 102A includes a plurality of APs 142A-1 through 142A-N. Similarly, site 102N includes a plurality of APs 142N-1 through 142N-N. Each AP 142 may be any type of wireless access point, including, but not limited to, a commercial or enterprise AP, a router, or any other device capable of providing wireless network access.

Each site 102A-102N also includes a plurality of client devices, otherwise known as user equipment devices (UEs), referred to generally as UEs 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring or other wearable device. UEs 148 may also include IoT client devices such as printers, security devices, environmental sensors, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 136. As shown in FIG. 1A, the various devices and systems of network 100 are coupled together via one or more network(s) 134, e.g., the Internet and/or an enterprise intranet. Each one of the servers 110, 116, 122 and/or 128, APs 142, UEs 148, NMS 136, and any other servers or devices attached to or forming part of network system 100 may include a system log or an error log module wherein each one of these devices records the status of the device including normal operational status and error conditions.

In the example of FIG. 1A, NMS 136 is a cloud-based computing platform that manages wireless networks 106A-106N at one or more of sites 102A-102N. In accordance with the techniques described herein, NMS 136 monitors one or more SLE metrics of the wireless networks 106A-106N at each site 102A-102N, respectively, and manages network resources, such as APs 142 at each site, to deliver a high quality wireless experience to end users, IoT devices and clients at the site.

In some examples, NMS 136 implements a virtual network assistant (VNA) that provides real-time insights and simplified troubleshooting for IT operations, and that automatically takes corrective action or provides recommendations to proactively address wireless network issues. Further example details of operations implemented by the VNA of NMS 136 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," and U.S. application Ser. No. 16/296,902, filed Mar. 8, 2019, and entitled "Method for Conveying AP Error Codes Over BLE Advertisements," all of which are incorporated by reference herein in their entirety.

In accordance with one or more techniques of this disclosure, NMS 136 is configured to detect insufficient RF coverage areas in wireless networks 106A-106N. For example, to detect one or more insufficient RF coverage areas in wireless network 106A at site 102A, NMS 136 determines one or more SLE metrics for each UE 148A-1 through 148A-N communicating via wireless network 106A at site 102A. In some examples, the SLE metrics may include a coverage metric, an insufficient capacity metric, and/or a roaming metric. However, any other SLE metric, or any other metrics that measure one or more aspects of wireless network performance may also be used, and the disclosure is not limited in this respect. Each SLE metric is associated with a particular UE 148 and a particular AP 142 at the site. In some examples, NMS 136 classifies each of these SLE metrics is as "good," "fair," or "poor." In other examples, NMS 136 classifies each SLE metric as "good" or "poor." The classified SLE metrics are periodically aggregated to an associated one of the plurality of AP devices on a per-AP basis. Each AP 142A-1 through 142A-N is assigned an AP score based on the aggregated SLE metrics associated with that AP.

NMS 136 builds a data structure, such as a network connectivity graph, indicative of network connectivity of the APs at the site 102. The network connectivity graph may include data indicative of neighbor relationships between APs at the site. Example techniques for determining the location of one or more APs in a wireless network and/or building a location graph of one or more APs in a wireless network are described in U.S. application Ser. No. 16/676,812 (no this one is location of client devices, not APS), filed Nov. 7, 2019, and entitled, "Wireless Signals for Location Determination," U.S. application Ser. No. 16/915,447 (looks like APs and/or WTs), filed Jun. 29, 2020, and entitled, "Location Determination Based on Phase Differences," U.S. application Ser. No. 16/832,560 (describes network connectivity graph), filed Mar. 27, 2020, and entitled, "Wi-Fi Management in the Presence of High Priority Receivers," U.S. application Ser. No. 16/915,615 (looks like APs or WTs), filed Jun. 29, 2020, and entitled, "Aligned Multi-Wireless Device Location Determination," and U.S. application Ser. No. 16/915,381 (location of WTs), filed Jun. 29, 2020, and entitled, "Multi-Wireless Device Location Determination," all of which are incorporated herein by reference in their entirety.

To identify a potential "coverage hole" in network 106A with insufficient RF coverage, NMS 136 groups APs with poor AP scores by identifying a first AP in wireless network 106A having a poor AP score and having at least one neighboring AP that also has a poor AP score to define a group of APs that represent a potential coverage hole. In some examples, NMS 136 refers to the network connectivity graph to determine neighbor relationships between APs in network 106A.

In some examples, for each group of APs that represents a potential coverage hole, NMS 136 attempts to address the potential coverage hole by modifying (e.g., increasing) the transmission power of one or more APs in the group in order to improve the AP scores of one or more APs in the group. In this way, NMS 136 automatically corrects the potential coverage hole, thus automatically improving the underlying SLE metrics and also automatically improving the user experience.

In other examples, for each group of APs that represents a potential coverage hole, NMS 136 applies root cause analysis and determines whether a root cause of the poor AP score for each AP in the group can be automatically resolved by the NMS. In some examples, NMS may apply machine learning techniques to identify the root cause of the SLE metrics underlying the poor AP score(s). If the root cause of the poor AP score may be automatically resolved, NMS 136 invokes one or more corrective actions to correct the root cause of the poor AP score for one or more APs in the group in order to improve the AP scores of one or more APs in the group. In this way, NMS 136 automatically corrects the potential coverage hole, thus automatically improving the underlying SLE metrics and also automatically improving the user experience.

Further example details of root cause analysis and automatic correction techniques performed by NMS 136 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," and U.S. application Ser. No. 16/296,902, filed Mar. 8, 2019, and entitled "Method for Conveying AP Error Codes Over BLE Advertisements," all of which are incorporated by reference herein in their entirety.

Based on the root cause analysis and/or automatic correction of potential coverage holes, if NMS 136 determines that the root cause of at least one of the APs in a group can be automatically resolved, NMS 136 determines that the group of APs does not represent a true coverage hole. NMS 136 automatically invokes one or more corrective actions to address (e.g., correct or eliminate) the potential coverage hole. However, if NMS 136 determines that the root cause of the poor AP scores for all of the APs in a group cannot be addressed automatically, NMS 136 may monitor the group of APs representing the potential coverage hole to determine whether the potential coverage hole persists for at least a predetermined period of time. For example, the predetermined period of time may be one or more days, one week, or other appropriate period of time. If the potential coverage hole is not persistent, NMS 136 determines that the group of APs does not represent a true coverage hole. If the potential coverage hole is persistent, NMS 136 determines that the group of APs represents a true coverage hole and generates a notification regarding the true coverage hole to the customer and/or IT operations.

Although the techniques of the present disclosure are described in this example as performed by NMS 136, it shall be understood that techniques described herein for detecting insufficient RF coverage areas in wireless network may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 136, or may be distributed throughout network 100, and may or may not form a part of NMS 136.

The techniques of this disclosure provide one or more advantages. For example, the techniques provide for automatic identification of APs forming a true coverage hole at a site. Rather than conducting a site survey and monitoring of wireless signal strength to identify potential coverage holes, the techniques of the disclosure replace manual troubleshooting tasks with automated wireless operations. This may help to minimize costs while maximizing Wi-Fi performance and reliability. As another advantage, the techniques of the disclosure automatically attempt to adjust the power of APs in a group representing a potential coverage hole, and/or determine whether the root cause of a potential coverage hole may be automatically resolved, thus eliminating the need for manual intervention and proactively optimizing wireless network performance. The techniques of the disclosure identify a group of specific which APs that represent a true coverage holes and automatically generate recommended corrective actions that may be taken by IT personnel to resolve the root cause. This further saves time and effort by IT personnel by pinpointing which APs need to be addressed and the specific remedial action(s) to be taken. In addition, by automatically addressing potential coverage holes and identifying true coverage holes, the techniques of the present disclosure may result in a higher quality user experience as measured by one or more SLE metrics.

Figure 1B:
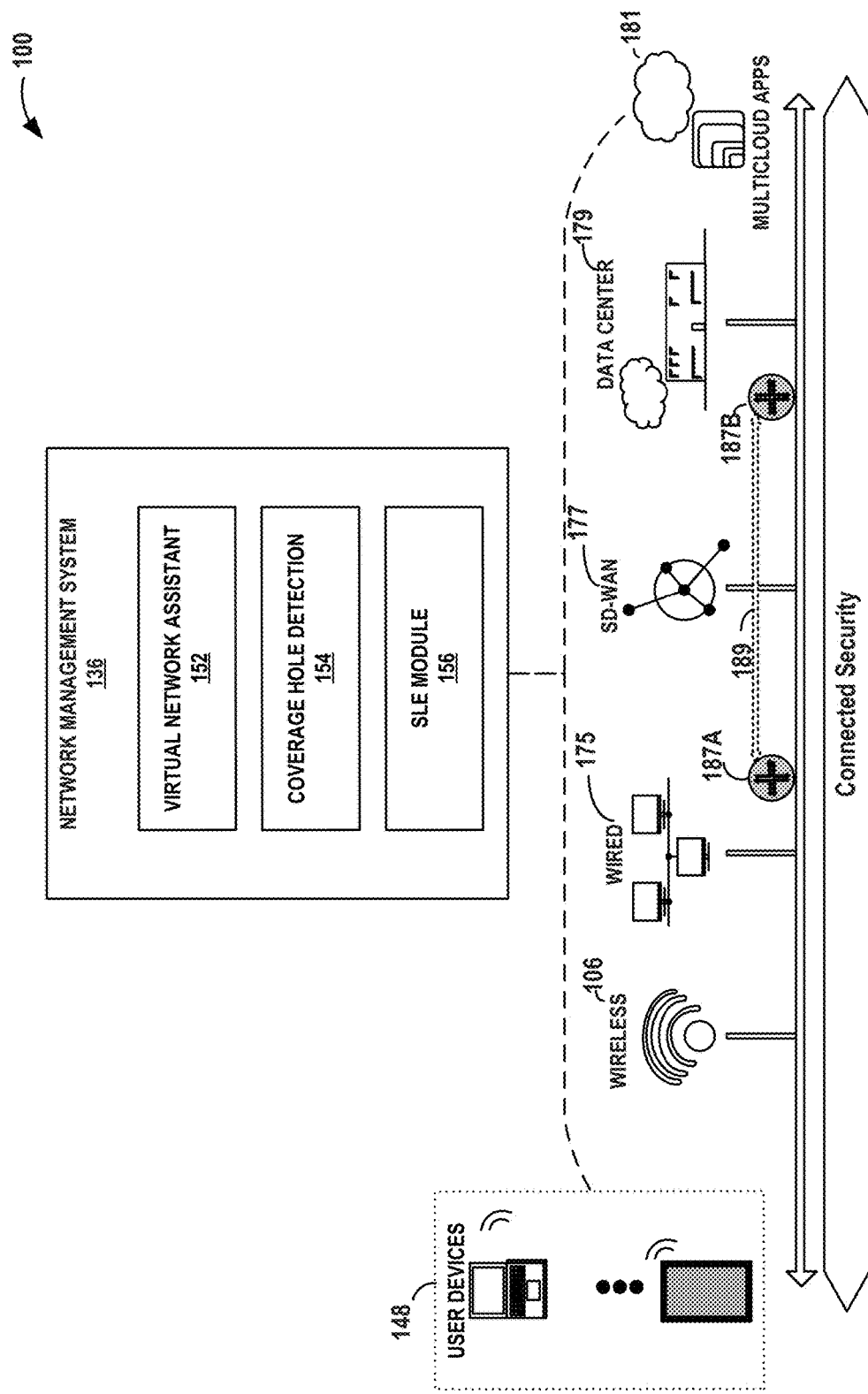
FIG. 1B is a diagram illustrating further example details of the network system of FIG. 1A.

FIG. 1B is a block diagram illustrating further example details of the network system of FIG. 1A. In this example, FIG. 1B illustrates NMS 136 configured to operate according to an artificial intelligence/machine-learning-based computing platform providing comprehensive automation, insight, and assurance (WiFi Assurance, Wired Assurance and WAN assurance) spanning from wireless networks 106 and wired LAN 175 networks at the network edge (far left of FIG. 1B) to cloud-based application services 181 hosted by computing resources within data centers 179 (far right of FIG. 1B). In accordance with one or more techniques of this disclosure, NMS 136 is configured to detect insufficient RF coverage areas in wireless networks 106A-106N. For example, to detect one or more insufficient RF coverage areas in any of wireless network(s) 106, NMS 136 determines one or more SLE metrics for each UE 148 communicating via wireless networks 106 as described herein. To that end, NMS 136 includes a virtual network assistant/artificial intelligence (VNA/AI) module 152, a coverage hole detection module 154, and a SLE metric module 156 that, when executed by one or more processors of NMS 136, enable NMS 136 to detect one or more insufficient RF coverage areas in any of wireless networks 106.

As described herein, NMS 136 provides an integrated suite of management tools and implements various techniques of this disclosure. In general, NMS 136 may provide a cloud-based platform for wireless network data acquisition, monitoring, activity logging, reporting, predictive analytics, network anomaly identification, and alert generation. For example, network management system 136 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 136 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 136 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur.

Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Patent No. U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Figure 2:
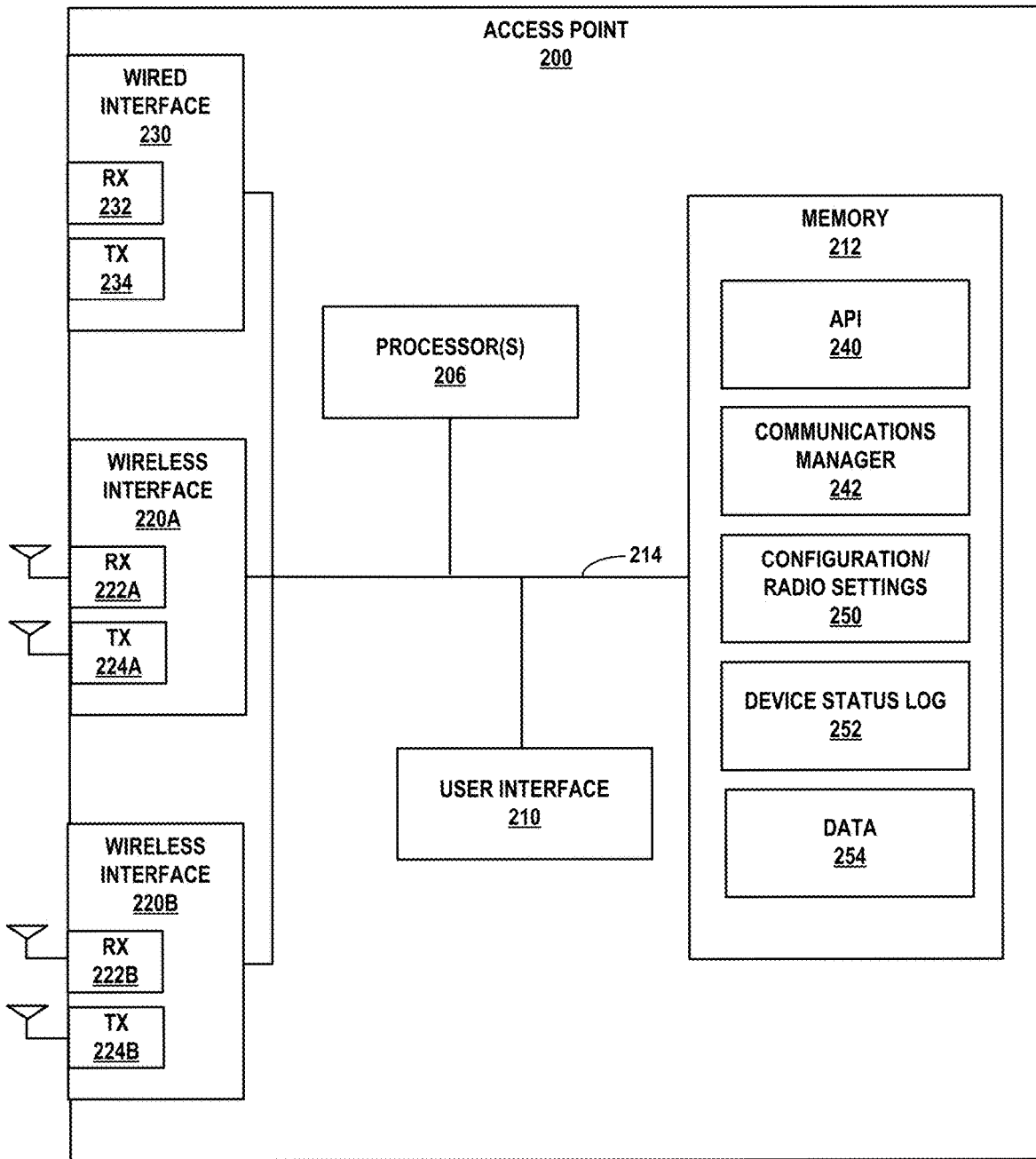
FIG. 2 is a block diagram of a wireless access point device, in accordance with one or more techniques of this disclosure.

FIG. 2 is a block diagram of an example access point (AP) device 200 configured in accordance with one or more techniques of this disclosure. As described herein, AP device 200 may measure and report SLE-related data to NMS 136. The SLE-related data may include various parameters indicative of the performance and/or status of the wireless network. The parameters may be measured and/or determined by one or more of the UE devices and/or by one or more of the APs 200 in a wireless network. NMS 136 determines one or more SLE metrics based on the SLE-related data received from the APs in a wireless network. In accordance with one or more techniques of this disclosure, NMS 136 analyzes SLE metrics associated with a wireless network to detect insufficient RF coverage areas in the wireless network. Example access point 200 shown in FIG. 2 may be used to implement any of APs 142 as shown and described herein with respect to FIG. 1. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B one or more processor(s) 206, memory 212, and a user interface 210, coupled together via a bus 214 over which the various elements may exchange data and information. Wired interface 230 represents a physical network interfaces and includes a receiver 232 and a transmitter 234 for sending and receiving network communications, e.g., packets. Wired interface 230 couples, either directly or indirectly, access point 200 to network(s) 134 of FIG. 1. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1. First and second wireless interfaces 220A and 220B further include transmitters 224A and 224B, respectively, each including transmit antennas via which access point 200 may transmit wireless signals to wireless communications devices, such as UEs 148 of FIG. 1. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming modules and/or data associated with operation of access point 200. Memory 212 may include one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 stores executable software including an application programming interface (API) 220, a communications manager 222, configuration settings 250, a device status log 252 and data storage 254. Device status log 252 includes a list of events specific to access point 200. The events may include a log of both normal events and error events such as, for example, memory status, reboot events, crash events, Ethernet port status, upgrade failure events, firmware upgrade events, configuration changes, etc., as well as a time and date stamp for each event. Data storage 254 may store any data used and/or generated by access point 200, including data collected from UEs 148, such as data used to calculate one or more SLE metrics, that is transmitted by access point 200 for cloud-based management of wireless networks 106A by NMS 136.

Communications manager 222 includes program code that, when executed by processor(s) 206, allow access point 200 to communicate with UEs 148 and/or network(s) 134 via any of interface(s) 230 and/or 220A-220C. Configuration settings 250 include any device settings for access point 200 such as radio settings for each of wireless interface(s) 220A-220C. These settings may configured manually or may be remotely monitored and managed by NMS 136 to optimize wireless network performance on a periodic (e.g., hourly or daily) basis.

User interface 210 represents physical hardware components that enable interaction with a user, such as buttons, a display and the like. Although not shown, memory 212 typically stores executable software for controlling user interface 210.

Figure 3:
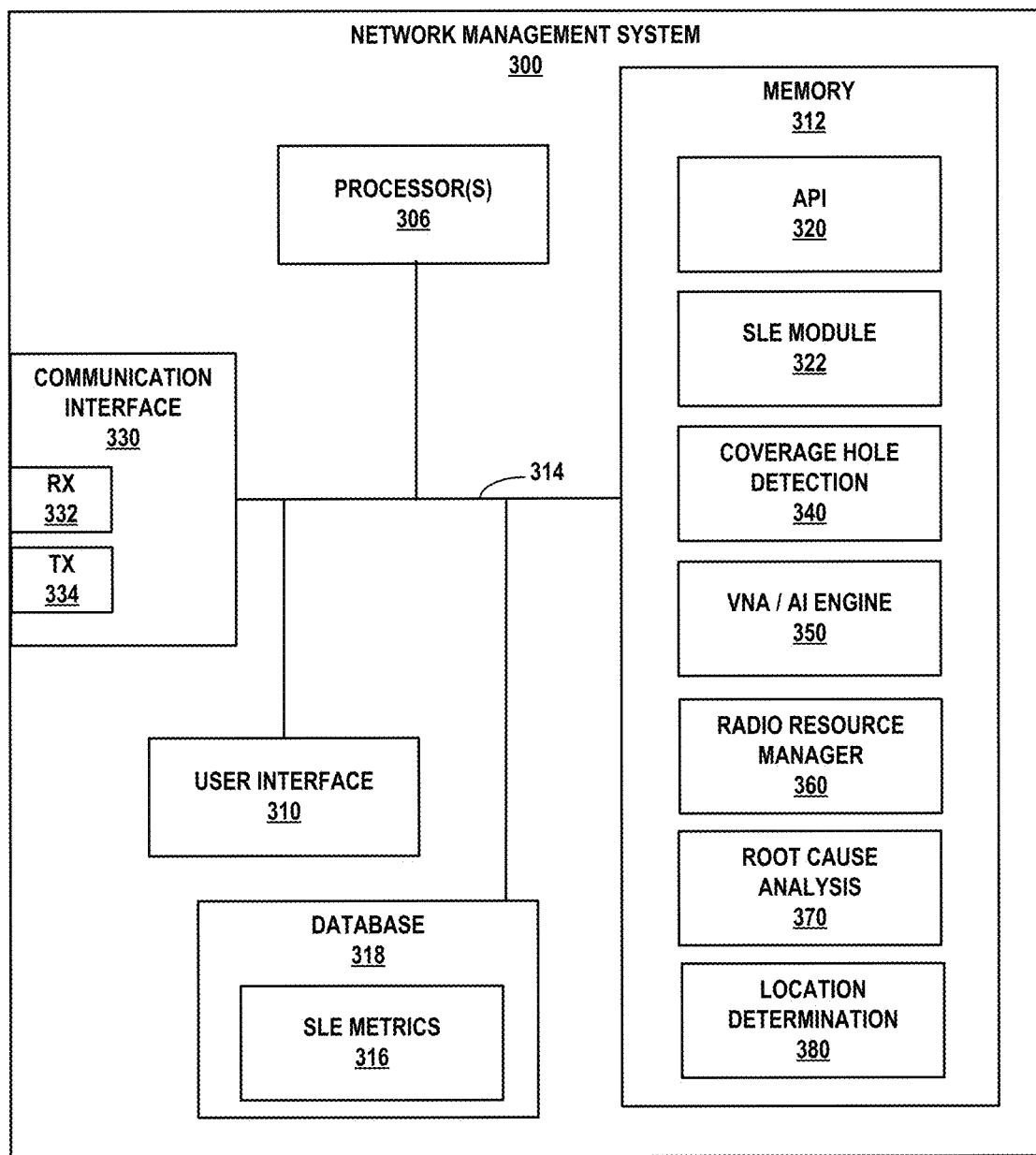
FIG. 3 is a block diagram of an example network management system configured to detect areas of insufficient RF coverage in wireless networks at one or more sites in a network system, in accordance with one or more techniques of this disclosure.

FIG. 3 shows an example network management system (NMS) 300 configured in accordance with one or more techniques of this disclosure. NMS 300 may be used to implement, for example, NMS 136 in FIG. 1. In such examples, NMS 300 is responsible for monitoring and management of one or more wireless networks 106A-106N at sites 102A-102N, respectively. In some examples, NMS 300 receives data collected by APs 200 from UEs 148, such as data used to calculate one or more SLE metrics, and analyzes this data for cloud-based management of wireless networks 106A-106N. In some examples, NMS 300 may be part of another server shown in FIG. 1 or a part of any other server.

NMS 300 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1, and/or any local area networks. Communications interface 330 includes a receiver 332 and a transmitter 334 by which NMS 300 receives/transmits data and information to/from any of APs 142, servers 110, 116, 122, 128 and/or any other devices or systems forming part of network 100 such as shown in FIG. 1. The data and information received by NMS 300 may include, for example, SLE related or event log data received from access points 200 used by NMS 300 to remotely monitor the performance of wireless networks 106A-106N. NMS may further transmit data via communications interface 330 to any of network devices such as APs 142 at any of network sites 102A-102N to remotely manage wireless networks 106A-106N.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 220, an SLE metric determination module 322, a coverage hole detection module 340, a virtual network assistant (VNA)/AI engine 350, a radio resource management (RRM) engine 360, and a root cause analysis engine 370. NMS 300 may also include any other programmed modules, software engines and/or interfaces configured for remote monitoring and management of wireless networks 106A-106N, including remote monitoring and management of any of APs 142/200.

SLE module 322 enables set up and tracking of thresholds for SLE metrics for each network 106A-106N. SLE module 322 further analyzes SLE-related data collected by APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. One or more of the SLE metrics may further be aggregated to each AP at a site to gain insight into each APs contribution to wireless network performance at the site. The SLE metrics track whether the service level meets the configured threshold values for each SLE metric. Each metric may further include one or more classifiers. If a metric does not meet the SLE threshold, the failure may be attributed to one of the classifiers to further understand where the failure occurred.

Example SLE metrics and their classifiers that may be determined by NMS 300 are shown in Table 1.

TABLE 1

| | |
|---|---|
| Time to Connect | The number of connections that took longer than a specified threshold to connect to the internet. Classifiers: association, authorization, DHCP, internet services |
| Throughput | The amount of time, that a client's estimated throughput is below a specified threshold. Classifiers: capacity, coverage, device capability, network issues |
| Coverage | The number of user minutes that a client's RSSI as measured by the access point is below a specified threshold. Classifiers: asymmetry downlink, asymmetry uplink, Wi-Fi interference |
| Capacity | The number of user minutes that a client experiences "poor" (insufficient) capacity. Classifiers: AP load, non-Wi-Fi interference, Wi-Fi interference |
| Roaming | The percentage of successful roams between 2 access points for clients that are within a specified target time that it takes for a client to roam. Classifiers: no fast roam, suboptimal 11r roam, suboptimal okc roam, slow roam |
| Successful Connects | The percentage of successful Authorization, Association, DHCP, ARP, and DNS attempts during an initial connection by a client to the network, when a client roams from one AP to the next, and on an on-going basis. Classifiers: association, authorization, DHCP |
| AP Health | This may be calculated based on AP Reboots, AP Unreachable events, and Site Down events. Classifiers: AP re-boot, AP Unreachable, Site Down |

RRM engine 360 monitors one or more metrics for each site 106A-106N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 106 with an aim to improve the coverage and capacity SLE metrics and thus to provide an improved wireless experience for the user.

VNA/AI engine 350 analyzes data received from APs 142/200 as well as its own data to identify when undesired to abnormal states are encountered in one of wireless networks 106A-106N. For example, VNA/AI engine 350 may use root cause analysis module 370 to identify the root cause of any undesired or abnormal states. In some examples, root cause analysis module 370 utilizes artificial intelligence-based techniques to help identify the root cause of any poor SLE metric(s) at one or more of wireless network 106A-106N. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoke downloading of new software to an AP, switch, or router, etc. These corrective actions are given for example purposes only, and the disclosure is not limited in this respect.

If automatic corrective actions are not available or do not adequately resolve the root cause, VNA/AI engine 350 may proactively provide a notification regarding the true coverage hole including recommended corrective actions to be taken by IT personnel to address the true coverage hole.

Coverage hole detection module 340 is configured to detect insufficient RF coverage areas in one or more wireless networks, such as one or more of wireless networks 106A-106N, in accordance with one or more techniques of this disclosure. For example, to detect one or more insufficient RF coverage areas in wireless network 106A at site 102A of FIG. 1, SLE module 322 of NMS 300 determines one or more SLE metrics for each UE 138A-1 through 138A-N at site 102A. In some examples, the SLE metrics may include a coverage metric, an insufficient capacity metric, and/or a roaming metric. However, any other SLE metric, or any other metrics that measure one or more aspects of wireless network performance may also be used, and the disclosure is not limited in this respect. Coverage hole detection module 340 of NMS 300 classifies each of these SLE metrics according to some threshold measure relevant to the particular SLE metric. The classified SLE metrics are periodically aggregated to an associated one of the plurality of AP devices 142A-1 through 142A-N on a per-AP basis. Each AP 142A-1 through 142A-N is assigned an AP score based on the aggregated SLE metrics associated with that AP.

The NMS 300 builds a data structure, such as a network connectivity graph, indicative of network connectivity between the APs at the site. The network connectivity graph may be stored as a data structure including data indicative of neighbor or connectivity relationships between APs at the site. Coverage hole detection module 322 of NMS 300 builds a data structure, such as a network connectivity graph, indicative of network connectivity between APs at the site. neighborhood AP graph of the sites 102 indicative of neighbor relationships between APs at the site. NMS 300 may execute AP location determination module 380 as part of the AP neighborhood graph building process.

To identify a potential "coverage hole" in network 106A at site 102A with insufficient RF coverage, for example, NMS 300, executing coverage hole detection module 340, groups APs with poor AP scores by identifying a first AP at site 102A having a poor AP score and having at least one neighboring AP that also has a poor AP score. For each AP in a group, NMS 300 may automatically attempt to address the potential coverage hole by increasing the transmission power of one or more APs in the group, determine a root cause of the poor AP score for one or more APs in the group and/or determine whether the root cause(s) may be automatically resolved. If the NMS is able to correct the poor AP score of one or more APs in the group, or if a root cause of at least one of the APs in a group may be automatically resolved, NMS 300 determines that the group of APs does not represent a true coverage hole. The NMS then proceeds to invoke corrective action to resolve the root cause of the poor AP score(s). If the root cause of the poor AP score for at least one of the APs cannot be addressed automatically, NMS 300 monitors the group of APs representing the potential coverage hole to determine whether the potential coverage hole persists for at least a predetermined period of time. If the potential coverage hole is not persistent, NMS 136 determines that the group of APs does not represent a true coverage hole. If the potential coverage hole is persistent, NMS 136 determines that the group of APs represents a true coverage hole and generates a notification regarding the true coverage hole to the customer and/or IT operations.

In some examples, coverage hole detection module 340 may form part of VNA/AI engine 350. For example, upon identification of a potential coverage hole by coverage hole detection module 340, VNA/AI engine 350 may automatically invoke root cause analysis module 370 to determine a root cause of the potential coverage hole. The root cause analysis may analyze one or more SLE metrics used to identify the potential coverage hole in order to identify the root cause of the potential coverage hole. VNA/AI engine 350 may further automatically invoke one or more corrective actions aimed at addressing the potential coverage hole. Examples of corrective actions that may be automatically invoked by VNA/AI engine 350 to address a potential coverage hole may include, but are not limited to, invoking RRM 360 to reboot one or more APs, adjusting the power of a specific radio in a specific AP, adding SSID configuration to a specific AP, changing channels on an AP or a set of APs, etc. If the automatically invoked corrective actions are able to adequately address the potential coverage hole, coverage hole detection module 340 determines that the potential coverage hole is not a true coverage hole. If automatic corrective actions are not available or do not adequately resolve the root cause of the potential coverage hole, coverage hole detection module 340 determines that the potential coverage hole is a true coverage hole. For true coverage holes, VNA/AI engine 350 may proactively provide notifications including information about the true coverage hole and/or recommended for corrective actions to be taken by IT personnel.

Figure 4:
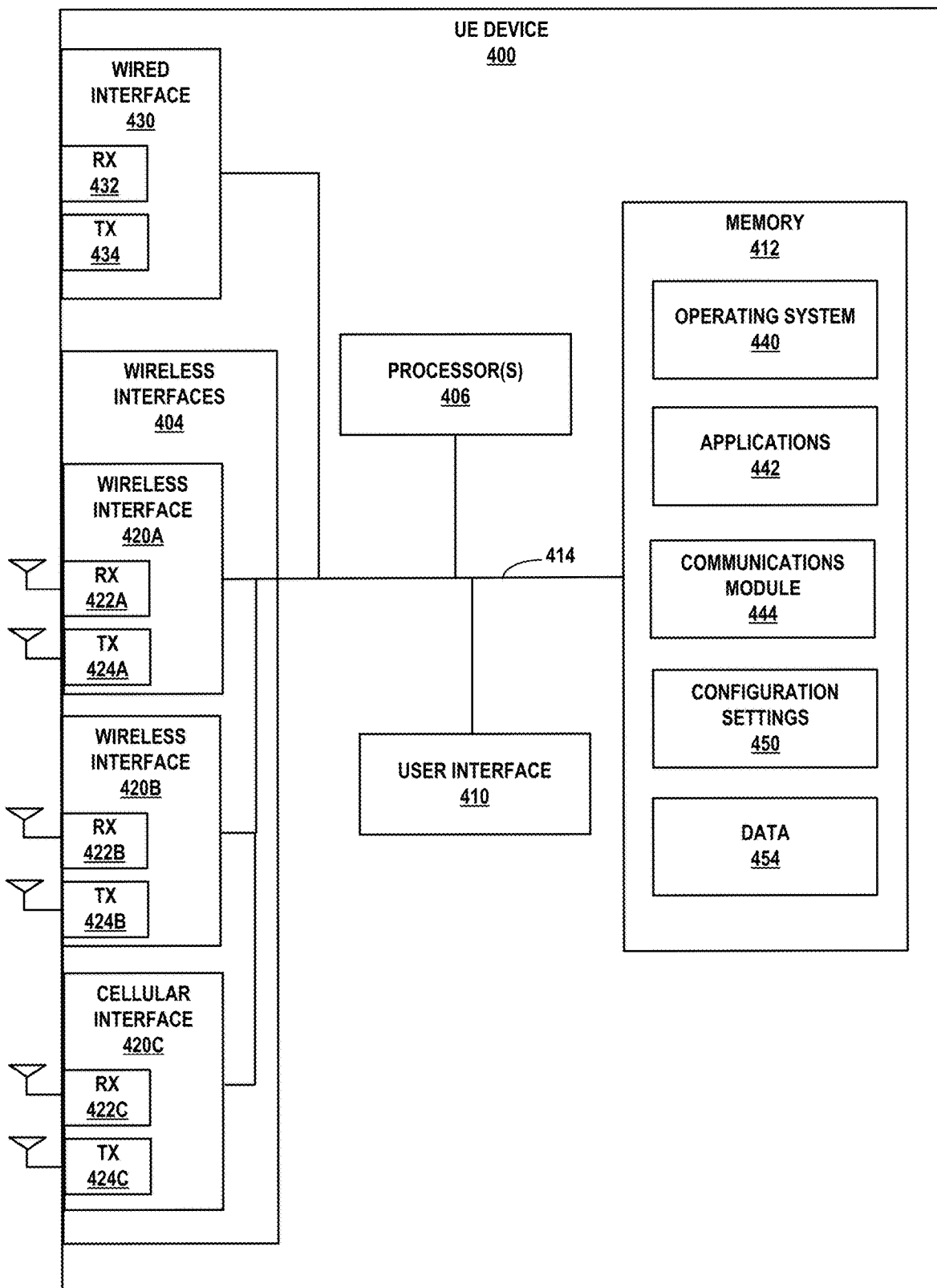
FIG. 4 is a block diagram of an example user equipment device, in accordance with one or more techniques of this disclosure.

FIG. 4 shows an example user equipment (UE) device 400. Example UE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

In accordance with one or more techniques of this disclosure, one or more SLE parameter values (that is, data used by NMS 136/300 to calculate one or more SLE metrics) are received from each UE 400 in a wireless network. For example, NMS 136/300 receives one or more SLE parameter values from UEs 148 in networks 106A-106N of FIG. 1. In some examples, NMS 136/300 receives the SLE parameter values from UEs 148 on a continuous basis, and NMS 136/300 may calculate one or more SLE metrics for each UE on a periodic basis as defined by a first predetermined period of time (e.g., every 10 minutes or other predetermined time period).

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1. First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1, AP 200 of FIG. 2, other UEs 138 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. Memory 412 may include one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage 454. Data storage 454 may include, for example, a status/error log including a list of events and or SLE-related data specific to UE 400. The events may include a log of both normal events and error events. Data storage 454 may store any data used and/or generated by UE 400, such as data used to calculate one or more SLE metrics, that is collected by UE 400 and transmitted to any of APs 138 in a wireless network 106 for further transmission to NMS 136/300.

Communications module 424 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Figure 5A:
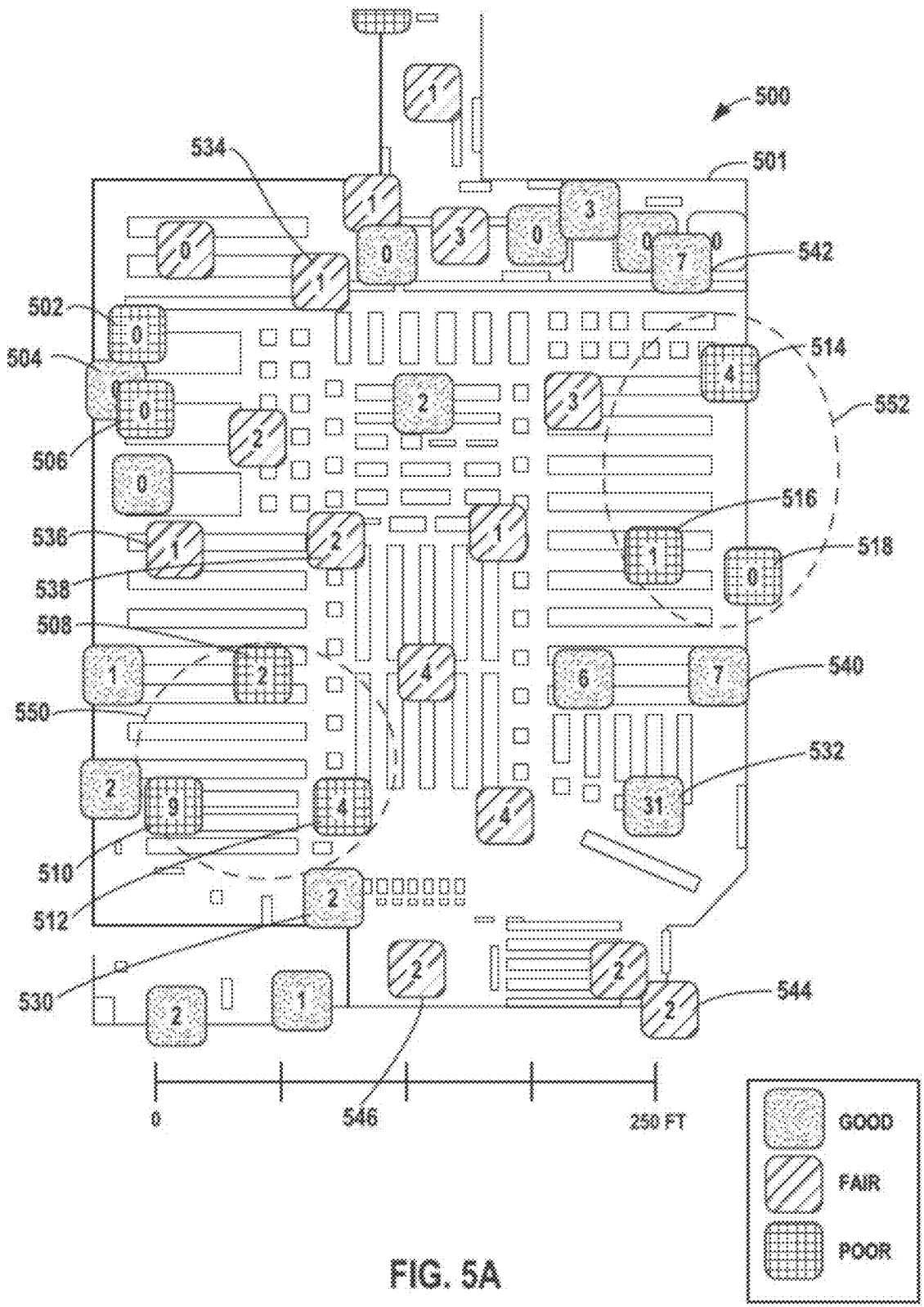
FIG. 5A is a diagram of an example site map showing a location and AP score for multiple APs at a site, in accordance with one or more techniques of this disclosure.

FIG. 5A is a diagram of an example site map 500 showing a location and an AP score for multiple APs at a site, in accordance with one or more techniques of this disclosure. In accordance with the techniques described herein, NMS 136/300 may construct and output (e.g., for display), for each wireless network 106A-106N, a topological representation of any one of the respective wireless networks 106A-106N. The topological representation may take any form (e.g., a site map, a matrix, a graphic, text, etc.). Site map 500 includes the physical boundaries of the site 501 and the relative location of each AP 502, 504, etc., at site 501. Each square represents a single AP radio 502, 504, etc. The color/fill pattern of each square represents the AP score for that AP during a current timeframe. The number on each square represents the number of UEs connected to the AP during the current timeframe.

The relative location of each AP at a site may be determined in several ways. Example techniques for determining the location of one or more APs in a wireless network are described in U.S. application Ser. No. 16/676,812, filed Nov. 7, 2019, and entitled, "Wireless Signals for Location Determination," U.S. application Ser. No. 16/915,447, filed Jun. 29, 2020, and entitled, "Location Determination Based on Phase Differences," U.S. application Ser. No. 16/832,560, filed Mar. 27, 2020, and entitled, "Wi-Fi Management in the Presence of High Priority Receivers," U.S. application Ser. No. 16/915,615, filed Jun. 29, 2020, and entitled, "Aligned Multi-Wireless Device Location Determination," and U.S. application Ser. No. 16/915,381, filed Jun. 29, 2020, and entitled, "Multi-Wireless Device Location Determination," all of which are incorporated by reference herein in their entirety.

Figure 5B:
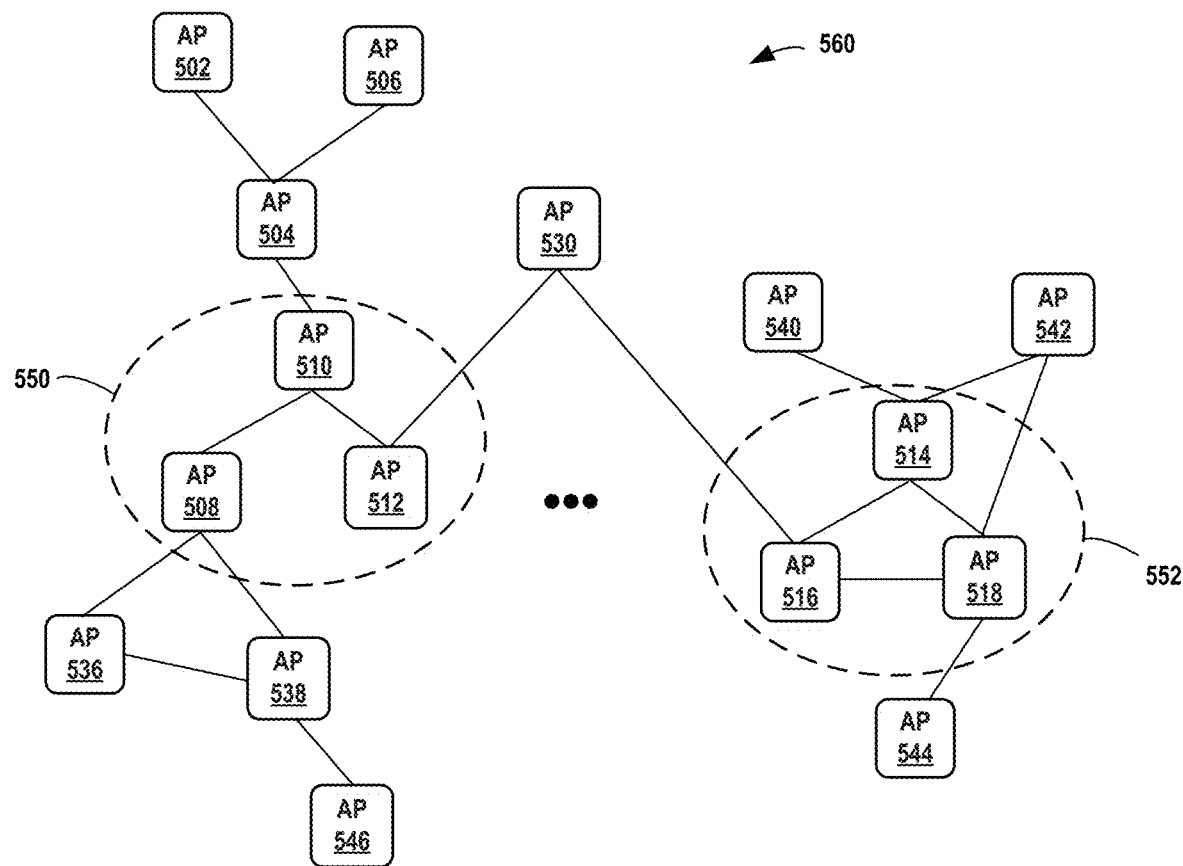
FIG. 5B is an example network connectivity graph showing an example group of APs defining a potential coverage hole, in accordance with one or more techniques of this disclosure.

FIG. 5B shows a portion of an example network connectivity graph 560 corresponding to the site map 500 and site 501 as shown in FIG. 5A. NMS 136/300 builds a network connectivity graph, such as graph 560 of FIG. 5B, indicative of the neighbor relationships between APs at a site. Example techniques for building a network connectivity graph of one or more APs in a wireless network are described in U.S. application Ser. No. 16/832,560, filed Mar. 27, 2020, and entitled, "Wi-Fi Management in the Presence of High Priority Receivers," which is incorporated by reference herein in its entirety. In some examples, two APs are considered to be "neighbors" if the signal strength (e.g., RSSI) of received signals transmitted by the other AP satisfy a predetermined threshold. As one example, to construct the network connectivity graph, each AP listens to signals transmitted by its neighboring APs and captures their corresponding RSSI. The APs then forward the said RSSIs to a computation device (e.g., NMS 136/300). In accordance with a specific embodiment, the network management system may use prior knowledge of the locations where the various APs are mounted. NMS 136/300 uses the RSSI information received from the APs to construct a network connectivity graph wherein the nodes in the graph correspond to the Wi-Fi nodes and the edges connecting the nodes correspond to the RSSI that each node receives from its neighboring nodes. The system may employ a predetermined threshold wherein only RSSIs greater than the threshold are used to construct the network graph. The graph may be represented by a data structure such as, for example, an adjacency list or a two-dimensional adjacency matrix, among other implementations. However, it shall be understood that these are described for example purposes only, and that the disclosure is not limited in this respect.

FIG. 5B shows a portion of a network connectivity graph 560 showing example neighbor connectivity relationships between some (but not all for the sake of brevity) of the APs at site 501. In this example, AP 502 has a single neighbor, 504. AP 510 has three neighbors, AP 504, 508 and 512. AP 512 has two neighbors, AP 510 and AP 530. AP 508 has three neighbors, AP 510, AP 536 and AP 538. AP 536 has two neighbors, AP 508 and AP 538. AP 538 has three neighbors, AP 508, AP 536, and AP 546. It shall be understood that network connectivity graph 560 is one example visual representation of a network connectivity graph, and that the disclosure is not limited in this respect.

As shall be understood by reviewing the example site map 500 of FIG. 5A and the example network connectivity graph of FIG. 5B, the neighbor relationships between APs do not necessary correspond to physical proximity of the APs with respect to each other. For example, although AP 530 is physically nearer to AP 510 as compared to AP 504 (as shown in site map 500 of FIG. 5A) AP 504 is a neighbor of AP 510 for purposes of network connectivity while AP 530 is not (as shown in network connectivity graph 560 of FIG. 5B). This is because the physical proximity of APs with respect to each other is not necessarily reflective of the network connectivity between the two APs. For example, two APs that are in different rooms may be relatively close to each other (e.g., on either side of a wall dividing the rooms), but due to interference of the wall (or other object) they may not be neighbors in terms of network connectivity. Similarly, two APs that are not necessarily proximately located with respect to each other but that have a clear line of sight between them may have good connectivity and therefore may be neighbors in terms of network connectivity.

To detect one or more coverage holes, NMS 136/300 determines one or more SLE metrics for each UE (e.g., UEs 148 of FIG. 1) based on SLE parameter values received from the respective UE at site 501. The data underlying the SLE metrics (SLE parameters) are measured on a continuous basis by each UE and as such are a time series of values. In some examples, the SLE metrics calculated by NMS 136/300 may include a coverage metric and/or a roaming metric. However, any SLE metric or other metric that measures one or more aspects of wireless network performance may be used, and the disclosure is not limited in this respect. NMS 136/300 classifies each SLE metric based on the SLE metrics determined for the plurality of UEs over a predetermined period of time. In some examples, NMS 136/300 classifies each of SLE metric as "good," "fair," or "poor." In other examples, NMS 136/300 classifies each SLE metric as either "good" or "poor." The classified SLE metrics are periodically aggregated to an associated one of the plurality of AP devices on a per-AP basis. Each AP is assigned an AP score based on the classified SLE metrics associated with that AP.

In the example site map of FIG. 5A, the AP score for each AP at site 501 is determined based on the SLE coverage metrics calculated for each client device at the site. As indicated by the color/fill pattern of the individual APs on map 500, APs 504, 530, and 532 have been determined to have a "good" AP score for the timeframe, APs 534, 536 and 538 have been determined to have a "fair" AP score for the timeframe, and APs 502, 506, 508, 510, 512, 514, 516, and 518 have been determined to have a "poor" AP score for the timeframe.

To identify one or more potential "coverage holes" with insufficient RF coverage in the wireless network at site 501, NMS 136/300 groups APs with poor AP scores by identifying a first AP at site 501 having a poor AP score and having at least a predefined number of (e.g., one, two or more) neighboring APs that also have poor AP scores. To identify a first AP in a group, NMS 136/300 analyzes each AP having a poor AP score to determine whether it has at least one neighboring AP that also has a poor AP score. NMS 136/300 may refer to the network connectivity graph of the APs at the site 501, which includes the location information for each AP at site 501 and information concerning each APs neighboring APs. These APs (a first AP and at least one neighboring AP) are then grouped together as representing a potential coverage hole in the RF coverage at the site.

To give a specific example with reference to FIGS. 5A and 5B, assume that NMS 136/300 groups APs with poor AP scores by identifying a first AP at site 501 having a poor AP score and having at least two neighboring APs that also have poor AP scores. In this example, AP 510 is identified as a first AP having a poor AP score and APs 508 and 512 are identified as secondary APs having poor AP scores, as indicated in FIG. 5A, that are also "neighbors" of AP 510 as indicated by the network connectivity graph. In that example, APs 508, 510, and 512 define a first group 550 representing a potential coverage hole at site 501. Although AP 504 is also a neighbor of AP 510 as indicated in the network connectivity graph of FIG. 5B, it is not part of the group of APs representing a potential coverage hole 550 because it does not have a poor AP score, as indicated in FIG. 5A.

In addition, in this example, AP 514 is identified as a first AP and APs 516 and 518 are identified as secondary APs having poor AP scores that are also neighbors of AP 514 in the network connectivity graph of FIG. 5B. In that example, APs 514, 516, and 518 define a second group 552 representing a potential coverage hole at site 501.

When determining neighbor relationships between first AP and one or more secondary APs, in some examples, the system only determines that the secondary APs are neighbors of the first AP. In other words, if there are two or more secondary APs, the system does not necessarily determine whether those secondary APs are neighbors of each other in order to define a group representing a potential coverage hole. In FIG. 5B, for example, APs 508 and 512 are neighbors of AP 510; however, they are not neighbors of each other. As another example, APs 516 and 518 are both neighbors of AP 514, and they are also neighbors of each other. Both groups 550 and 552 are determined to represent potential coverage holes in this example.

As another example, APs 502 and 506, although both have poor AP scores, do not represent a potential coverage hole because they do not form part of a group in which a first AP has a poor score and also has at least two neighboring APs that also have a poor AP score. Instead, APs 502 and 506 are both neighbors of AP 504 (as indicated in the network connectivity graph of FIG. 5B) which has a good AP score, and therefore the criteria for defining a group of APs representing a potential coverage hole are not met.

In some examples, once a first AP and at least one secondary AP having poor AP scores have been identified, the system stops looking for further neighboring APs with poor AP scores, and that identified group (the first AP and at least one secondary AP) is determined to represent a potential coverage hole. In other examples, the system continues to look for all APs that are neighbors of the first AP having poor AP scores. Once all neighboring APs having poor AP scores are identified, that group of APs (a first AP and one or more secondary APs) is determined to represent a potential coverage hole. As another example, the system may extend the search for neighboring APs having poor AP scores to include neighbors of neighbors of the first AP. In FIG. 5B, for example, if AP 538 also had a poor AP score, the group 550 would also include AP 538 in that example, because AP 538 is a neighbor of AP 508, which is a neighbor of the first AP 510 of group 550.

For each AP in a group, in some examples, NMS may modify (e.g., increase) the transmit power of one or more APs in a group to correct the poor AP scores for one or more of the APs in the group, and thus eliminate (e.g., correct) the potential coverage hole. In another example, in addition to or alternatively to modifying the transmit power of one or more APs in a group, NMS 136/300 determines whether a root cause of the poor AP score can be automatically resolved. If the root cause of the poor AP score can be automatically resolved, NMS 136/300 invokes the mitigation action and determines that the group of APs does not represent a true coverage hole. For example, VNA/AI engine 350 (FIG. 3) may use root cause analysis module 370 to identify the root cause of the poor AP score for each AP in a group. In some examples, root cause analysis module 370 may utilize artificial intelligence-based techniques to help identify the root cause of any SLE metrics leading to the poor AP score for each AP in a group representing a potential coverage hole. In some examples, the SLE metric classifiers may be used, in conjunction with data received from one or more UEs, and/or other data, to determine the root cause of a poor AP score for each AP in a group representing a potential coverage hole.

In addition, VNA/AI engine 350 may automatically invoke one or more corrective actions intended to address the identified root cause(s) of the poor AP score(s) for one or more of the APs in a group. Examples of corrective actions that may be automatically invoked by VNA/AI engine 350 may include, but are not limited to, invoking RRM 360 to initialize one or more of the first and/or neighboring APs in the group, reboot one or more of the first AP and/or neighboring APs in the group, adjusting the power of one or more of the first and/or neighboring APs in the group, adjusting or changing one or more operating parameters of one or more of the first or neighboring APs in the group, adding S SID configuration to one or more of the first and/or neighboring APs in the group, changing channels on one or more of the first and/or neighboring APs in the group, or any other corrective action aimed at addressing the root cause of the poor AP score(s) for any of the APs in the group.

If the root cause of the poor AP scores for all of the APs in a group cannot be addressed automatically, NMS 136/300 monitors the group of APs representing the potential coverage hole to determine whether the potential coverage hole persists for at least a predetermined period of time. If the potential coverage hole is not persistent, NMS 136/300 determines that the group of APs does not represent a true coverage hole. If the potential coverage hole is persistent, NMS 136/300 determines that the group of APs represents a true coverage hole and generates a notification regarding the true coverage hole to the customer and/or IT operations. For example, if the potential coverage hole is persistent, VNA/AI engine 350 may proactively provide one or more notifications regarding the true coverage hole, the root cause of the true coverage hole and/or and recommended corrective actions to be taken by IT personnel to address the true coverage hole. For example, VNA/AI engine 350 may proactively provide notifications including an identification of each AP in a group representing the true coverage hole and recommended corrective actions to be taken by IT personnel to address the true coverage hole and thus to increase the user-experience as measured by one or more SLE metrics. As another example, VNA/AI engine 350 may provide a notification including an identification of a backhaul switch or identification of a backhaul router as the root cause of the true coverage hole, and recommend corrective action to be taken to address the true coverage hole.

In FIG. 5A, for example, if the poor AP score for any of APs 514, 516 and/or 518 is not persistent, NMS 136/300 determines that group 552 does not represent a true coverage hole. For example, underlying reason(s) for the poor AP score may be due to temporary issues in the network or may be healed during periodic network optimization. Temporary issues may include, for example, transient transmitter interference with AP operation in a specific location (e.g., a leaky microwave, RF test equipment, etc.), movement of metal objects within the radiation pattern of a Wi-Fi environment, etc.

As another example, if the poor AP scores for APs 508, 510, and 512 persist for at least a predetermined period of time (24 hours, for example), NMS may determine that group 550 represents a true coverage hole. VNA/AI engine 350 may proactively provide one or more notifications regarding the true coverage hole, the root cause of the true coverage hole and/or and recommended corrective actions to be taken by IT personnel to address the true coverage hole. For example, VNA/AI engine 350 may proactively provide notifications including an identification of each of APs 508, 510, and 512 as representing a true coverage hole and recommended corrective actions to be taken by IT personnel to address the true coverage hole. As another example, VNA/AI engine 350 may provide a notification including an identification of a backhaul switch or identification of a backhaul router as the root cause of the true coverage hole. As another example, the recommended actions may include inspecting the location at the site associated with the identified APs representing the true coverage hole to determine whether any objects that may interfere with RF communications are present at or near that location. As another example, the recommended actions may include adding an additional AP or moving existing APs to provide better coverage within the site. If so, IT personnel or other personnel at the site 501 may take action to address the issue.

The one or more SLE metrics for each UE in a wireless network may be periodically determined based on data received from the UE during a first predetermined time interval. The first predetermined time interval may be customized according to the service level expectations of a site. For example, when the first predetermined time period is 10 minutes, the one or more SLE metrics for each UE may be determined once every 10 minutes based on data received from the UE during that 10 minute time interval.

Example techniques for determination of one or more SLE metrics for a wireless network are described in U.S. application Ser. No. 16/251,942, filed Jan. 18, 2019, entitled, "Method for Spatio-Temporal Monitoring," which is incorporated by reference herein in its entirety.

The classified SLE metrics are periodically, e.g., based on a second predetermined time interval, aggregated to an associated one of the plurality of AP devices on a per-AP basis. In some examples, each AP is assigned an AP score of, for example, "good," "fair," or "poor" based on the aggregated SLE metrics associated with that AP. In other examples, each AP is assigned an AP score of "good" or "poor" based on the aggregated SLE metrics associated with that AP. The second predetermined time interval may be customized according to the service level expectations of a site. The SLE metrics are aggregated to a particular AP based on whether the UE associated with the SLE metric was connected to that particular AP during the current predetermined time interval. For example, when the first predetermined time interval is 10 minutes and the second predetermined time interval is one hour, the SLE metrics associated with an AP may be periodically aggregated to the AP during a sliding one-hour time window that is updated every 10 minutes with the most current SLE metrics associated with that AP. Each AP is assigned an AP score based on the classified SLE metrics aggregated over the second predetermined time period (in this example, over the most recent one hour time period).

To determine if a group of APs representing a potential coverage hole is persistent and thus represents a true coverage hole, NMS 136/300 may monitor the AP scores for each AP in the group to determine if the poor AP scores persist for at least a third predetermined time interval. The third predetermined time interval may be customized according to the service level expectations of a site. For example, the third predetermined time interval may be 12 hours, 1 day, 2 days, etc. In such examples, NMS 136/300 may monitor the AP scores for each AP in the group over the predetermined time period to determine if the poor AP scores persist during that predetermined time period. If so, NMS 136/300 may identify the group of APs as representing a true coverage hole.

Figure 6:
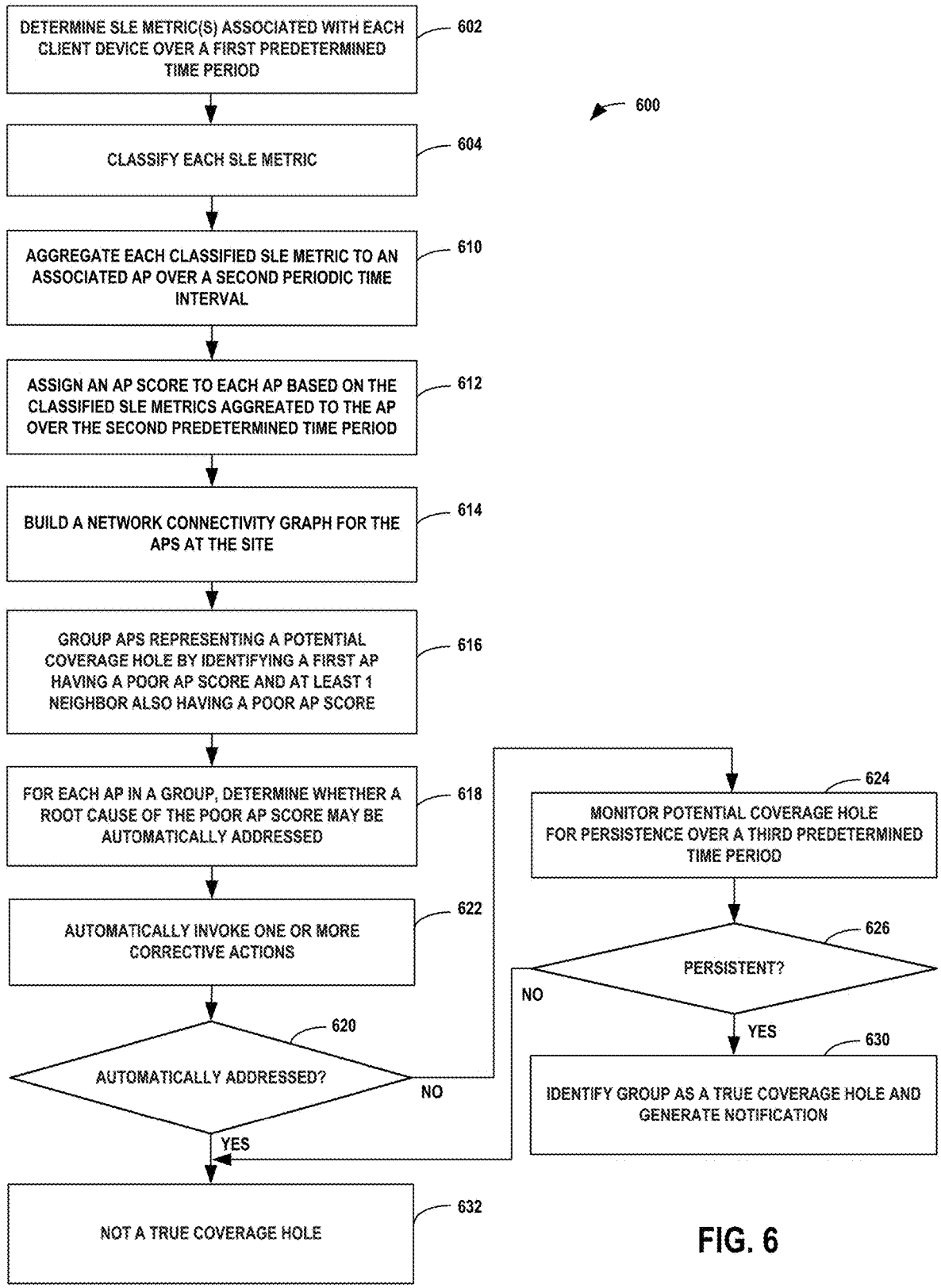
FIG. 6 is a flowchart of an example process for detection of areas of insufficient RF coverage in a wireless network, in accordance with one or more techniques of this disclosure.

FIG. 6 is a flowchart of an example process (600) by which a computing device, such as NMS 136/300 as shown in FIG. 1 and/or FIG. 3, respectively, detects insufficient RF coverage areas in a wireless network, in accordance with one or more techniques of this disclosure. Although FIG. 6 is described as being executed out by NMS 136/300, any computing device or group of computing devices may execute the functions described herein, and the disclosure is not limited in this respect.

The computing device receives one or more SLE metrics for each UE device in a wireless network over a first predetermined time period (602). For example, NMS 136/300 may receive one or more SLE metrics for each UE 148A-1 through 148A-N in wireless network 106A every 10 minutes or on some other periodic basis suitable for determining meaningful SLE metrics in a wireless network. In some examples, the SLE metrics may include a coverage metric, an insufficient capacity metric, and/or a roaming metric. However, any SLE metric or other metric that measures one or more aspects of wireless network performance may be used, and the disclosure is not limited in this respect.

The computing device classifies each of the one or more SLE metrics (604). For example, the computing device may classify each SLE coverage metric based on a comparison of each SLE metric to a baseline for that SLE metric. The baseline may be determined based on the SLE metrics received from all UEs in a wireless network over a fourth predetermined time interval. In some examples, the fourth predetermined time interval may be one week or some other time interval suitable for establishing a baseline for each particular SLE metric. For example, for site 106A of FIG. 1, the baseline may be determined based on the one or more SLE metrics received from all UEs 148A-1 through 148A-N during a one week time interval. The baseline may be adjusted on sliding on a daily, weekly, or on some other periodic time basis.

For example, to establish the threshold for the RSSI SLE, the method determines the average RSSI from all of the UEs in the network according to the following:

$$\text{Ave RSSI} = (\Sigma_{i=1}^{m}(\text{RSSIi}))/m$$

Where
Ave RSSI—the average RSSI in the network
RSSIi—RSSI measured by the $i^{th}$ UE
m—the number of UEs in the network
The method then determines the variance of the RSSIs in the network as follows:

$$\text{Var RSSI} = (\Sigma_{i=1}^{m}(\text{RSSIi} - \text{Ave RSSI})^2)/m$$

where
Var RSSI—variance of the RSSI
Ave RSSI—the average RSSI in the network
RSSIi—RSSI measured by the $i^{th}$ UE
m—the number of UEs in the network.

In accordance with one example implementation, the thresholds for determining between a good, fair and poor RSSI SLE are determined as follows:

$$\text{RSSI Threshold1} = \text{Ave RSSI} - 3*\text{SQRoot}(\text{Var RSSI})$$

$$\text{RSSI Threshold2} = \text{Ave RSSI} - 2*\text{SQRoot}(\text{Var RSSI})$$

Using the above example thresholds, the SLE score is considered to be good when the measured RSSI is greater than threshold 2. It is considered to be fair when the measured RSSI is between RSSI Threshold 1 and RSSI threshold 2. The SLE score is considered to be poor when it is lower than the RSSI Threshold 1.

It shall be understood that this method of determining an RSSI SLE metric is described for example purposes only, that other methods and/or equations for determining an RSSI SLE metric may be used, and that the disclosure is not limited in this respect.

The classification of each of the one or more SLE metrics determined based on the comparison to the baseline SLE metric may be further based on configurable thresholds for each of the classifications. The configurable thresholds may be determined based on, for example, service level expectations for the site. For example, the thresholds may be determined so as to define at least two SLE metric classifications, such as "good" and "poor," or to define at least three SLE metric classifications, such as "good," "fair," and "poor."

The computing device aggregates each of the classified SLE metrics to an associated one of the plurality of AP devices on a per-AP basis over a second predetermined time interval (610). Each SLE metric is associated with a particular UE and a particular AP to which it is communicating (or attempting to communicate) at the time the SLE metric is determined. For example, NMS 136/300 may aggregate SLE metrics to each AP 142A-1 through 142A-N in wireless network 106A during a sliding one-hour time window or on some other time interval suitable for determining meaningful SLE metrics in a wireless network. The one-hour time window is updated periodically, e.g., every ten minutes in this example to include the most recent SLE metric determinations for the AP.

The computing device assigns each AP an AP score based on the aggregated SLE metrics associated with that AP (612). The computing device may may take sticky clients into account (i.e., clients that fail to roam from one AP to another AP even though their received signal strength is decreased). In other words, the computing device may detect SLE metrics associated with sticky clients and eliminate them from consideration when assigning AP scores. Example thresholds for determining the AP score are shown in Table 2:

TABLE 2

| Aggregated SLE metrics (% of clients classified) | AP score |
| --- | --- |
| >80% good | good |
| 50-80% good | fair |
| <50% good | poor |

NMS 136/300 may assign AP scores (612) based on, for example, a first example regression model or a second example regression model as described further below.

The computing devices builds network connectivity graph indicative of network connectivity between the APs at the site (614). In some examples, this may also include generating, for display on a user computing device, a site map including a location of each AP at the site and the AP score for each AP at the site (614). The site map may also include, for each AP at the site, a number of UEs connected to that AP for the time period during which the AP score was determined.

In one example, the computing device groups APs as representing a potential coverage hole by identifying a first AP having a poor AP score and having at least one neighbor also having a poor AP score (616). For example, in the site map 500 of FIG. 5, the computing device may analyze the APs having a poor AP score (e.g., each of APs 502, 504, 514, 516, 518, 508, 510, and 512) to determine whether any of them have at least one neighbor (as determined by reference to the network connectivity graph) that also has a poor AP score.

In this example, APs 508, 510 and 512 form a first group representing a first potential coverage hole and APs 514, 516 and 518 form a second group representing a second potential coverage hole. As described above, for this example, APs 502 and 504 do not form a group representing a potential coverage hole.

In some examples, for each group of APs that represents a potential coverage hole, the computing device attempts to address the potential coverage hole by modifying (e.g., increasing) the transmission power of one or more APs in the group in order to improve the AP scores of one or more APs in the group (622). In this example, the computing device need not necessarily execute step (618) if the corrective action addresses the potential coverage hole. In this way, NMS 136/300 automatically corrects the potential coverage hole, thus automatically improving the underlying SLE metrics and also automatically improving the user experience.

In another example, in addition or alternatively, the computing device determines whether a root cause of the poor AP score(s) for one or more of the APs in a group can be automatically resolved (618). For example, VHA/AI engine 350 of NMS 300 (or NMS 136) may use root cause analysis module 370 to identify the root cause of the poor AP score for one or more of the APs in the group and/or any potential corrective actions that may be taken to automatically resolve the root cause. In some examples, root cause analysis module 370 utilizes artificial intelligence-based techniques to help identify the root cause of any poor SLE metric(s) that form the basis of the poor AP score and/or any potential corrective actions that may be taken to automatically resolve the root cause.

Example techniques for determining a root cause of undesirable or abnormal conditions and potential corrective actions in a wireless network are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," and U.S. application Ser. No. 16/296,902, filed Mar. 8, 2019, and entitled "Method for Conveying AP Error Codes Over BLE Advertisements," all of which are incorporated by reference herein in their entirety.

If the root cause of the poor AP score may be automatically resolved (YES branch of 620), the computing device automatically invokes one or more corrective actions to correct the root cause of the poor AP score for one or more APs in the group in order to improve the AP scores of one or more APs in the group (622). If the root cause of the poor AP score is automatically resolved (YES branch of 620), the computing device determines that the group of APs does not represent a true coverage hole (632).

If the root cause of the poor AP score may not be automatically resolved (NO branch of 620), the computing device monitors the group of APs representing the potential coverage hole to determine whether the potential coverage hole persists for a fourth predetermined period of time (624). If the potential coverage hole is not persistent (NO branch of 626), the computing device determines that the group of APs representing the potential coverage hole do not represent a true coverage hole. If the potential coverage hole is persistent (YES branch of 626), the computing device determines that the group of APs representing the potential coverage hole represent a true coverage hole (630). The computing device may proactively provide one or more notifications regarding the true coverage hole, the root cause of the true coverage hole and/or and recommended corrective actions to be taken by IT personnel to address the true coverage hole (630).

Figure 10:
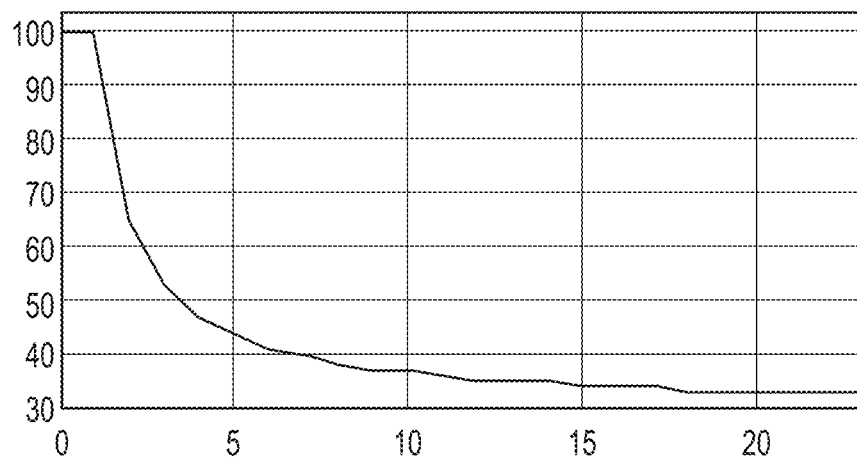
FIG. 10 is a graph of an example decay function showing persistence of potential coverages holes over time (in days).

FIG. 10 is a graph of an example decay function showing persistence of potential coverages holes over time (in days). In general, the percentage of potential coverages holes that persist drops over time. In this example, the percentage of potential coverages holes that were detected on day 0 (100%) dropped to about 45% at day 5, and to about 20% at day 15.

The example process (600) may be repeated each time the AP score is updated (e.g., every 10 minutes for the current one hour sliding window).

The techniques of this disclosure provide one or more advantages. For example, the techniques provide for automatic identification of a true coverage hole at a site. Rather than conducting a site survey or a manual testing of each AP and monitoring of wireless signal strength to identify potential coverage holes, the techniques of the disclosure replace manual troubleshooting tasks with automated wireless operations. This may help to minimize costs while maximizing Wi-Fi performance and reliability. As another advantage, the techniques of the disclosure automatically determine whether the root cause of a potential coverage hole may be automatically resolved, thus eliminating the need for manual intervention and proactively optimizing wireless network performance. The techniques of the disclosure identify a group of specific APs that represent a true coverage hole and automatically generate recommended corrective actions that may be taken by IT personnel to resolve the root cause. This further saves time and effort by IT personnel by pinpointing which APs need to be addressed and the specific remedial action(s) to be taken. In addition, by automatically addressing potential coverage holes and identifying true coverage holes, the techniques of the present disclosure may result in a higher quality user experience as measured by one or more SLE metrics.

In some examples, NMS 136 may classify SLE metrics (604) based on the following (shown with respect to an SLE coverage metric):

$$\text{Anomaly\_score} = (\text{SLE\_coverage} - \text{SLE\_coverage}_{baseline})/Err_{anomaly}$$

$$Err_{stat} \sim \sqrt{\frac{p(1-p)}{N} + \frac{1}{N^2}}, \quad N \approx \frac{T_{total}}{\text{Interval}}$$

$$Err_{sampling} = \sqrt{\frac{\sum_t p^2 \times T_{total}}{\sum_t T_{total}} - \left(\frac{\sum_t^a p \times T_{total}}{\sum_t T_{total}}\right)^2}$$

$$Err_{anomaly} = \sqrt{Err_{stat}^2 + Err_{sampling}^2}$$

In some examples, NMS 136 may assign AP scores (612) based on a first example regression model:

$$S(x, x_0) = \frac{1}{1 + \alpha e^{x - x_0}}$$

$$AP_{score} = C_0(1 - SLE_{coverage}) + C_1 S(n_{client}, 3) + C_2 S(10) + C_3 S(n_{client}, 3) +$$

$$C_4 S(SLE_{deviation}, 3) + C_5 S(N_{coverage}, 3) + C_6 S(n_{sticky client}, 3)$$

$$AP_{i,score}^{group} = AP_{i,score} + \sum_{j}^{neighbor} RSSI_{i,j} AP_{j,score}$$

In other examples, NMS 136 may assign AP scores (612) based on a second example regression model:

$$Z_1 = (1 + SLE_{coverage}) * N_{coverage}$$

$$Z_2 = SLE_{deviation-to-baseline} * N_{coverage}$$

$$Z_3 = (N_{impacted-clients} + \text{Utilization}_{normalized}) * \text{Packets}_{error-rate}$$

$$\text{Sigmoid}(x, x_0, \alpha) = \frac{1}{1 + e^{-(x - x_0)\alpha}}$$

$$AP_i = \sum_{i=1}^{3} (C_i * \text{sigmoid}(Z_i, Z_{i0}, \alpha_i))$$

Figure 7A:
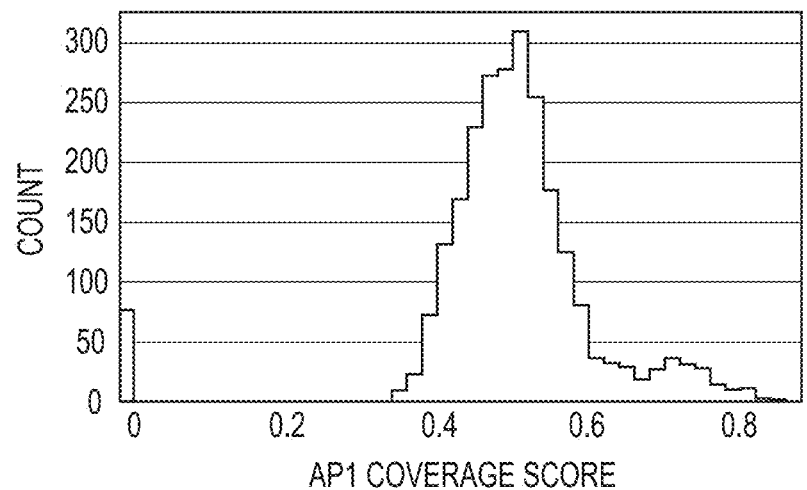
FIGS. 7A and 7B are graphs based on example data illustrating distributions of AP scores corresponding to a first example regression model and a second example regression model.
Figure 7B:
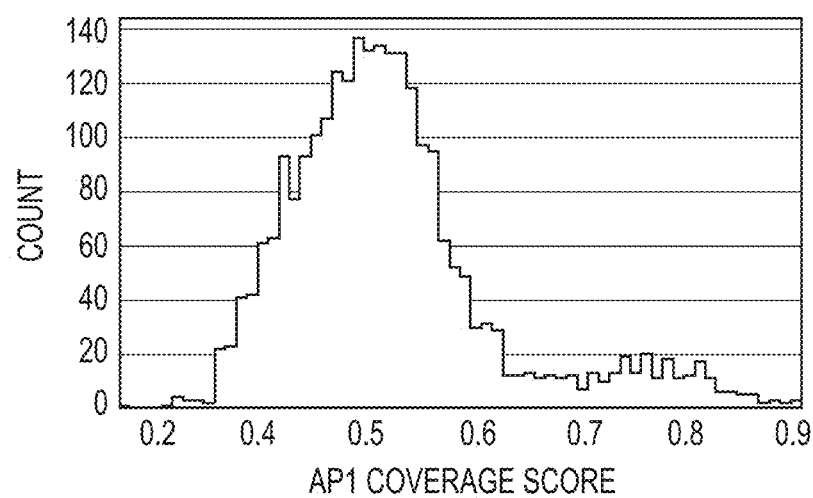

FIGS. 7A and 7B are graphs based on example data illustrating distributions of AP scores corresponding to the first example regression model (FIG. 7A) and the second example regression model (FIG. 7B).

Figure 8:
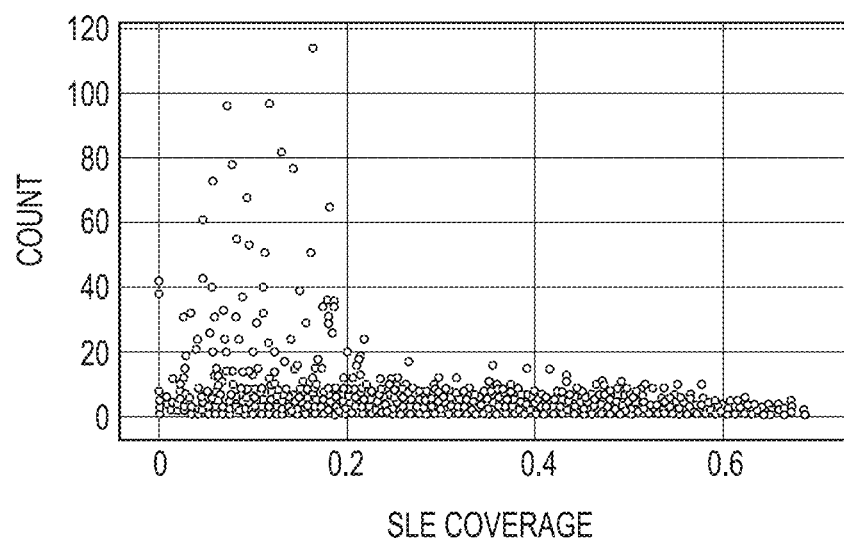
FIG. 8 is a scatter plot based on example data showing a number of SLE coverage metric anomalies detected in 24 hours vs. the average SLE coverage metric over the same 24 hour period.

FIG. 8 is a scatter plot based on example data showing a number of SLE coverage metric anomalies detected in 24 hours vs. the average SLE coverage metric over the same 24 hour period. In general, when the average SLE coverage metric was lower (indicating relatively poorer coverage), the number of detected anomalies in the SLE coverage metric was higher.

Figure 9:
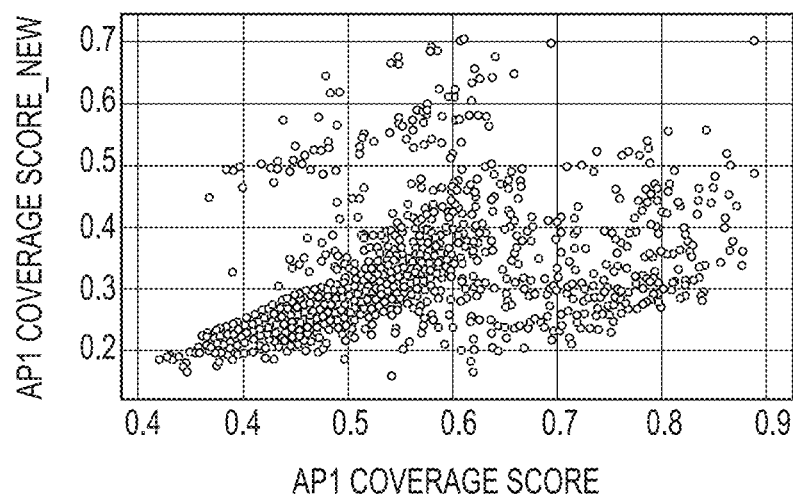
FIG. 9 is a graph showing a comparison of example AP scores determined using the second example regression model (y-axis) versus example AP scores determined using the first example regression model (x-axis).

FIG. 9 is a graph showing a comparison of example AP scores determined using the second example regression model (y-axis) versus example AP scores determined using the first example regression model (x-axis).

In some examples, NMS 136/300 may determine one or more additional metrics indicative of the impact of a true coverage hole on a wireless network at a site. In some examples, one or more of the additional metrics may be indicative of the impact of an AP having insufficient capacity on a wireless network at a site. For example, NMS 136/300 may determine a weighted client impact score based on a number of clients associated with each AP that is a member of a true coverage hole and/or AP having insufficient capac-ity, an AP channel utilization of each of those APs, and/or error rate(s) experienced by the clients associated with each AP. The weighted client impact score takes into account both the number of clients that each AP is currently associated with and also the number of network packets that are being transmitted/received by each AP from those clients. In this way, the weighted client impact score is reflective of a situation in which an AP is communicating with a large number of clients, an AP is communicating with one or more clients transmitting or receiving a large number of packets per unit time, or both. These score(s) may be reported to the customer and/or IT personnel to help gain insight into the relative impact of detected true coverage holes or AP having insufficient capacity, the root cause of the true coverage hole or AP having insufficient capacity, and/or remedial actions that may be taken to address the root cause of the true coverage hole or AP having insufficient capacity.

For example, NMS 136/300 may determine a weighted client impact score as follows:

weighted client impact=(num clients/5.0+util ap/5.0)* (2.0*error rate*util ap/100+1.0), where num clients—the number of client devices associated with an AP that is a member of a true coverage hole (or having insufficient capacity), util ap—the channel utilization of the AP, or the number of frames transmitted/received by the AP per unit time, either to/from other APs or to/from clients associated with the AP, error rate—the error rate experienced by each client associated with the AP.

Deweight num client error rate client=20, util ap=5% util ap=5, error rate=50%

NMS 136/300 may also detect and/or report one or more client symptoms or anomalies for those clients associated with true coverage holes or an AP with insufficient capacity. For example, NMS 136/300 may detect and report that one or more clients are receiving a weak signal from an AP (e.g., detection of a true coverage hole). NMS 136/300 may further detect and report uplink asymmetry (e.g., detect that a client device(s) receives a good signal (e.g., above a first predetermined threshold) from an associated AP, but the AP does not receive a good signal (e.g., above a second predetermined threshold) from the client device. The first and second thresholds may be the same or they may be different. In the case of uplink asymmetry, NMS 136/300 may generate a notification indicative that something in the environment is blocking RF signal, and/or including a recommendation that IT personnel check the environment to correct the detected issue.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology-Telecommunications and Information Exchange Between Systems-Local and Metropolitan Area Networks-Specific Requirements-Part 11: Wireless LAN Medium Access Control (MAC) and Physical Layer (PHY) Specifications Amendment 4: Enhancements for Very High Throughput for Operation in Bands below 6 GHz", December, 2013); IEEE 802.11 ad ("IEEE P802.11 ad-2012, IEEE Standard for Information Technology—Telecommunications and Information Exchange Between Systems-Local and Metropolitan Area Networks-Specific Requirements-Part 11: Wireless LAN Medium Access Control (MAC) and Physical Layer (PHY) Specifications-Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11 ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm®

Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A method comprising:
    identifying, by a network management system (NMS) that manages a plurality of access point (AP) devices in a wireless network, an area in the wireless network that represents a potential coverage hole in the wireless network, wherein the area representing the potential coverage hole comprises at least two neighboring AP devices of the plurality of AP devices that are each associated with one or more service level expectation (SLE) metrics indicative of an issue in the wireless network;
    determining, by the NMS, a root cause of the issue in the wireless network;
    performing, by the NMS, one or more actions to address the root cause of the issue in the wireless network; and
    determining, by the NMS and based on determining that the performance of the one or more actions does not resolve the root cause of the issue in the wireless network, that the area that represents the potential coverage hole in the wireless network represents a true coverage hole in the wireless network.

2. The method of claim 1, wherein identifying the area in the wireless network that represents a potential coverage hole in the wireless network comprises:
    assigning, by the NMS and based on the one or more SLE metrics associated with each of the at least two neighboring AP devices, a first AP score from a plurality of AP scores to each of the at least two neighboring AP devices, wherein the plurality of AP scores comprises the first AP score and a second AP score, the first AP score relatively lower than the second AP score; and
    grouping, by the NMS, the at least two neighboring AP devices based on the first AP score.

3. The method of claim 1, further comprising:
    generating, by the NMS, a notification regarding the area in the wireless network that represents the true coverage hole in the wireless network.

4. The method of claim 3, wherein the notification further comprises the root cause of the issue in the wireless network.

5. The method of claim 3, wherein the notification further comprises one or more recommended corrective actions.

6. The method of claim 1, further comprising:
    identifying, by the NMS, a second area in the wireless network that represents a second potential coverage hole in the wireless network, wherein the second area representing the second potential coverage hole comprises at least two neighboring AP devices of the plurality of AP devices that are each associated with one or more SLE metrics indicative of a second issue in the wireless network;
    determining, by the NMS, a root cause of the second issue in the wireless network;
    performing, by the NMS, one or more actions to address the root cause of the second issue in the wireless network; and
    determining, by the NMS and based on determining that the performance of the one or more actions does resolve the root cause of the second issue in the wireless network, that the second area that represents the second potential coverage hole in the wireless network does not represent a true coverage hole in the wireless network.

7. The method of claim 1, wherein performing one or more actions to address the root cause of the issue in the wireless network comprises:
    performing an action comprising at least one of:
        rebooting of one of the at least two neighboring AP devices;
        adjusting a power of a radio of one of the at least two neighboring AP devices;

adding an SSID configuration to one of the at least two neighboring AP devices; or changing a channel on one of the at least two neighboring AP devices.

8. The method of claim 1, wherein determining that the area that represents the potential coverage hole in the wireless network represents the true coverage hole in the wireless network further comprises:

determining, by the NMS, that the potential coverage hole in the wireless network persists for a threshold period of time.

9. The method of claim 8, wherein determining that the potential coverage hole in the wireless network persists for the threshold period of time comprises determining that a first AP score assigned to each of the at least two neighboring AP devices persists for the threshold period of time, wherein the first AP score is assigned from a plurality of AP scores, wherein the plurality of AP scores comprises the first AP score and a second AP score, the first AP score relatively lower than the second AP score.

10. A network management system comprising:

memory; and one or more processors operably coupled to the memory, wherein the one or more processors are configured to:

identify an area in a wireless network that represents a potential coverage hole in the wireless network, wherein the area representing the potential coverage hole comprises at least two neighboring access point (AP) devices of a plurality of AP devices in the wireless network that are each associated with one or more service level expectation (SLE) metrics indicative of an issue in the wireless network;

determine, a root cause of the issue in the wireless network;

perform, one or more actions to address the root cause of the issue in the wireless network; and determine, based on determining that the performance of the one or more actions does not resolve the root cause of the issue in the wireless network, that the area that represents the potential coverage hole in the wireless network represents a true coverage hole in the wireless network.

11. The network management system of claim 10, wherein to identify the area in the wireless network that represents a potential coverage hole in the wireless network, the one or more processors are configured to:

assign, based on the one or more SLE metrics associated with each of the at least two neighboring AP devices, a first AP score from a plurality of AP scores to each of the at least two neighboring AP devices, wherein the plurality of AP scores comprises the first AP score and a second AP score, the first AP score relatively lower than the second AP score; and group the at least two neighboring AP devices based on the first AP score.

12. The network management system of claim 10, wherein the one or more processors are further configured to:

generate a notification regarding the area in the wireless network that represents the true coverage hole in the wireless network.

13. The network management system of claim 12, wherein the notification further comprises the root cause of the issue in the wireless network.

14. The network management system of claim 12, wherein the notification further comprises one or more recommended corrective actions.

15. The network management system of claim 10, wherein the one or more processors are further configured to:

identify, a second area in the wireless network that represents a second potential coverage hole in the wireless network, wherein the second area representing the second potential coverage hole comprises at least two neighboring AP devices of the plurality of AP devices that are each associated with one or more SLE metrics indicative of a second issue in the wireless network;

determine, a root cause of the second issue in the wireless network;

perform, one or more actions to address the root cause of the second issue in the wireless network; and determine, based on determining that the performance of the one or more actions does resolve the root cause of the second issue in the wireless network that the second area that represents the second potential coverage hole in the wireless network does not represent a true coverage hole in the wireless network.

16. The network management system of claim 10, wherein to perform one or more actions to address the root cause of the issue in the wireless network, the one or more processors are configured to:

perform an action comprising at least one of:

rebooting of one of the at least two neighboring AP devices;

adjusting a power of a radio of one of the at least two neighboring AP devices;

adding an SSID configuration to one of the at least two neighboring AP devices; or changing a channel on one of the at least two neighboring AP devices.

17. The network management system of claim 10, wherein to determine that the area that represents the potential coverage hole in the wireless network represents the true coverage hole in the wireless network, the one or more processors are further configured to:

determine that the potential coverage hole in the wireless network persists for a threshold period of time.

18. The network management system of claim 17, wherein to determine that the potential coverage hole in the wireless network persists for the threshold period of time, the one or more processors are configured to determine that a first AP score assigned to each of the at least two neighboring AP devices persists for the threshold period of time, wherein the first AP score is assigned from a plurality of AP scores, wherein the plurality of AP scores comprises the first AP score and a second AP score, the first AP score relatively lower than the second AP score.

19. Non-transitory computer-readable storage media comprising instructions that, when executed, configure processing circuitry to:

identify an area in a wireless network that represents a potential coverage hole in the wireless network, wherein the area representing the potential coverage hole comprises at least two neighboring access point (AP) devices of a plurality of AP devices in the wireless network that are each associated with one or more service level expectation (SLE) metrics indicative of an issue in the wireless network;

determine a root cause of the issue in the wireless network;

perform one or more actions to address the root cause of the issue in the wireless network; and determine, based on determining that the performance of the one or more actions does not resolve the root cause of the issue in the wireless network, that the area that represents the potential coverage hole in the wireless network represents a true coverage hole in the wireless network.

* * * * *